(12) United States Patent
Sullivan et al.

(10) Patent No.: US 8,838,419 B2
(45) Date of Patent: Sep. 16, 2014

(54) SYSTEM AND METHOD FOR SIMULATING MACHINING OBJECTS

(75) Inventors: Alan Sullivan, Middleton, MA (US); Liana Manukyan, Tbilisi (GE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 459 days.

(21) Appl. No.: 13/168,582

(22) Filed: Jun. 24, 2011

(65) Prior Publication Data
US 2012/0330620 A1  Dec. 27, 2012

(51) Int. Cl.
| | |
|---|---|
| G06F 17/50 | (2006.01) |
| G06F 7/60 | (2006.01) |
| G06F 17/10 | (2006.01) |
| G06T 15/00 | (2011.01) |
| G06T 17/00 | (2006.01) |
| G06F 19/00 | (2011.01) |
| G05B 19/4097 | (2006.01) |
| G05B 19/4069 | (2006.01) |

(52) U.S. Cl.
CPC ........ *G05B 19/4069* (2013.01); *G05B 19/4097* (2013.01)
USPC ............... 703/1; 703/2; 345/419; 345/420; 700/97; 700/182

(58) Field of Classification Search
CPC .................... G05B 19/4069; G05B 19/4097
USPC .............. 703/1, 2; 345/419, 420; 700/97, 182
See application file for complete search history.

(56) References Cited

U.S. PATENT DOCUMENTS

| | | | | |
|---|---|---|---|---|
| 7,024,272 | B2 * | 4/2006 | Thomas et al. ............... | 700/182 |
| 7,346,417 | B2 * | 3/2008 | Luth et al. ..................... | 700/117 |
| 2003/0204285 | A1 * | 10/2003 | Thomas et al. ............... | 700/182 |
| 2006/0195303 | A1 * | 8/2006 | Thompson et al. .............. | 703/1 |
| 2010/0298967 | A1 * | 11/2010 | Frisken et al. ................ | 700/173 |
| 2011/0245954 | A1 * | 10/2011 | Sullivan et al. ............... | 700/104 |

OTHER PUBLICATIONS

Peter H. Ernst, NPL, "Boolean Set operations with solid models", 1995.*
Hong T. Yau, NPL, "Adaptive NC simulations for multi axis solid machining", 2005.*

* cited by examiner

*Primary Examiner* — Omar Fernandez Rivas
*Assistant Examiner* — Angel Calle
(74) *Attorney, Agent, or Firm* — Dirk Brinkman; Gene Vinokur

(57) ABSTRACT

A computer simulation of machining of an object by a motion of a tool is described. The object is represented by a boundary representation (BP) object, wherein the BP object includes a boundary representation of a surface of the object, wherein the motion is represented by a set of swept volumes, wherein the set of swept volumes includes a first set of implicit functions defining a surface of the set of swept volumes. The simulation includes determining a proxy object having a second set of implicit functions defining a surface of the proxy object; simulating the machining of the proxy object with the set of swept volumes to produce a machined proxy (MP) object having a third set of implicit functions defining a surface of the MP object; rendering an image of a Boolean intersection between the MP object and the BP object.

20 Claims, 15 Drawing Sheets

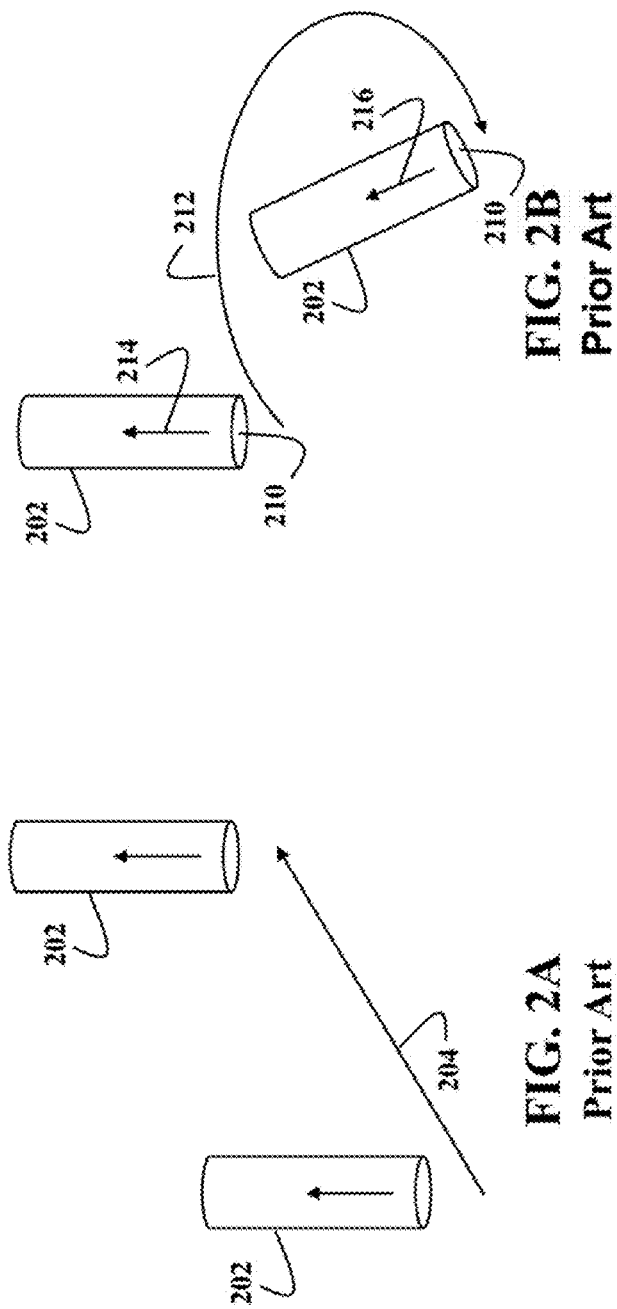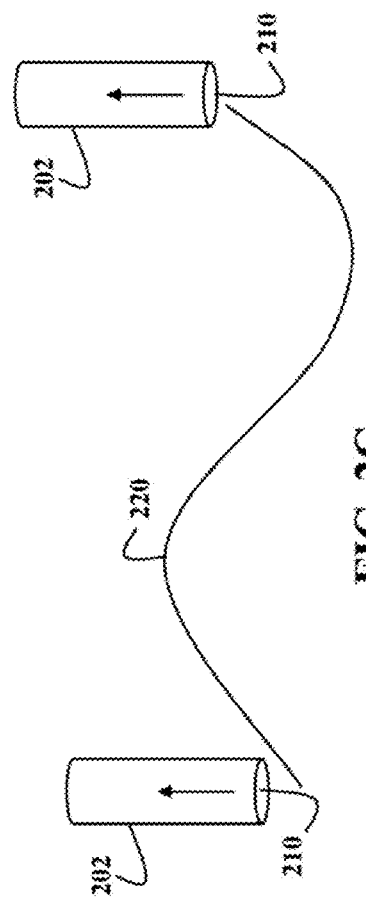

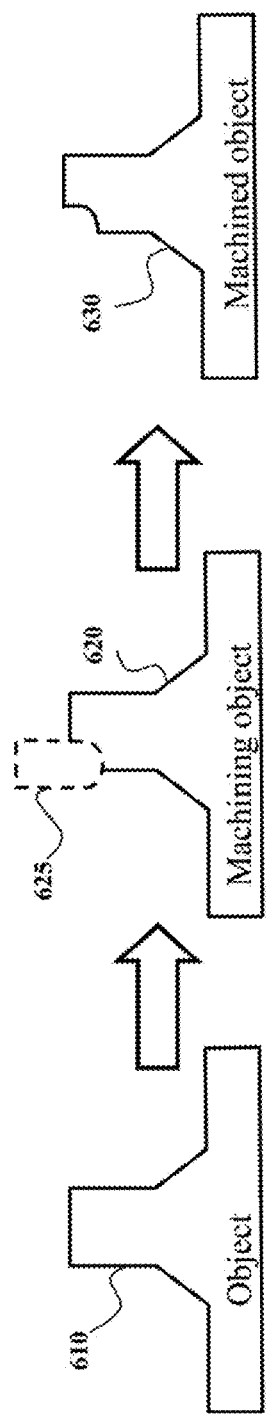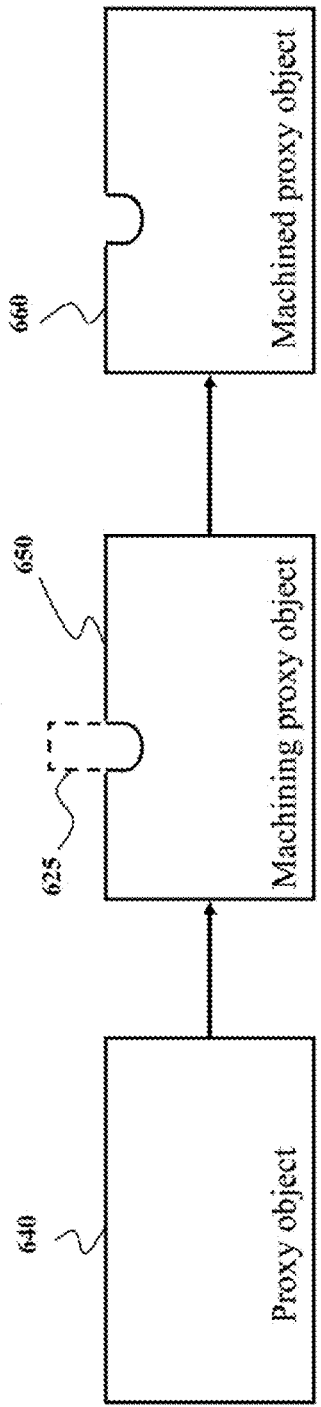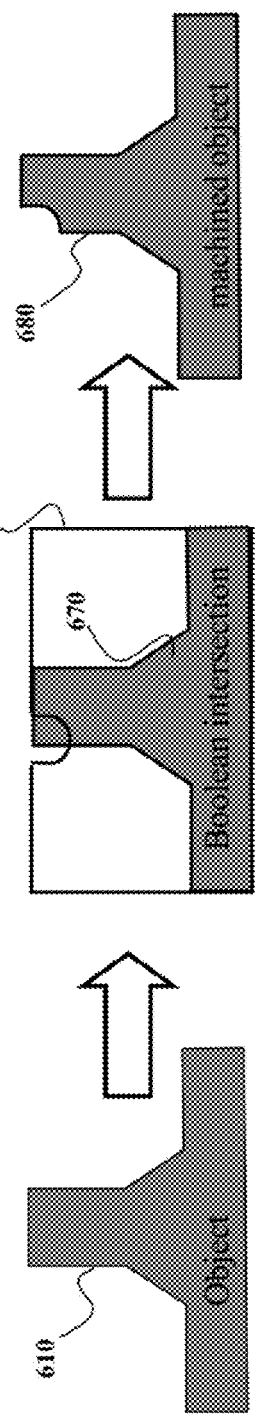
FIG. 6A Prior Art
FIG. 6B
FIG. 6C

700

800

SYSTEM AND METHOD FOR SIMULATING MACHINING OBJECTS

FIELD OF INVENTION

The invention relates generally to simulating machining, and more particularly to a system and a method for simulating machining the objects using a Boolean intersection.

BACKGROUND OF THE INVENTION

Numerically Controlled Machining

Simulating numerically controlled (NC) machining, e.g., turning, boring, drilling, broaching, sawing, shaping, reaming, milling, tapping, grinding, is important in computer aided design (CAD) and computer aided manufacturing (CAM). During the simulation, a model of an object, e.g., a workpiece, is edited with a computer representation of a tool, e.g., an NC milling tool, and a set of motions, which simulate the machining process.

The simulation visualizes the model of the object and the representation of the tool on a display device to detect potential collisions between parts, such as the workpiece and the tool holder, and to verify a final shape of the object.

The final shape of the object is affected by the selection of the tool and the motions. Instructions for controlling the motions are typically generated using a computer aided manufacturing system from a graphical representation of a desired final shape of the object. The motions are typically implemented using numerical control programming language, also known as preparatory code or G-Codes, see the RS274D and DIN 66025/ISO 6983 standards.

The G-Codes generated by the computer aided manufacturing system can fail to produce an exact replication of the desired final shape. In addition, the motion of the tool and/or object is governed by motors of the NC machining system, which have limited speeds, ranges of motion, and abilities to accelerate and decelerate, so that the actual motions sometimes do not exactly follow the NC machining instructions.

Discrepancies between the actual final shape of the object and the desired final shape of the object can be small, and difficult to observe. In some situations, these discrepancies result in undesirable gouges or nicks in the surface of the final shape of the object with sizes on the order of a few micrometers in depth and width, and tens of micrometers in length.

Typically, a set of NC machine instructions is tested by machining a test object, e.g., a workpiece made of softer, less expensive material prior to machining the desired part. If visual inspection of the test workpiece locates undesirable discrepancies in the test workpiece, then the NC machining instructions are modified accordingly.

However, this manual testing is time consuming and expensive. Time for machining a single test workpiece may be on the order of hours and several iterations may be required before an acceptable set of NC machine instructions is attained. Thus, it is desirable to test for these discrepancies using computer-based simulation and rendering.

Tools

FIG. 1A shows a set of typical tools 102, 104, 106, and 108 used in NC machining. When a tool is moved relative to a workpiece 110, the tool carves material out of the workpiece. Here, the tools 102, 104, 106, and 108 remove material, commonly referred to as a "swept volume," corresponding to surfaces 112, 114, 116, and 118 from the workpiece. The shape of the material removed by each tool is determined by the shape of the tool, and the path of the tool relative to the workpiece.

Swept Volumes

During machining, the tool moves relative to the workpiece according to a prescribed motion of the tool and/or workpiece, i.e., a tool path or an object path, where the path can include information about the relative position, orientation, and other shape data of the tool with respect to the workpiece.

As the tool moves along the tool path, the tool carves out a swept volume. During machining, as the tool moves along the tool path, a portion of a volume of the workpiece that is intersected by the swept volume of the tool is removed. This material removal can be modeled as a constructive solid geometry (CSG) difference operation, in which a portion of the workpiece is removed from the workpiece using a CSG subtraction operation of the swept volume from the workpiece.

FIG. 1B shows the swept volume 160 of a shape 150 that is moved along a path 152. The path 152 specifies a position of a particular point of the shape 150 as a function of time. The path can specify an orientation 156, 157, and 158 of the shape as a function of time. The path can also specify a scale of the shape or an arbitrary transformation of the shape as a function of time.

In FIG. 1B, the original position, orientation, and geometry of a shape 150 is transformed to a final position, orientation, and geometry of the shape 154 as the shape moves along the path 157.

FIG. 2A shows a linear path, in which a tool 202 is moved along a straight line 204.

FIG. 2B shows a circular arc path, in which a tip 210 of the tool 202 is moved along a circular arc 212, and an original axis direction 214 of the tool is transformed to a final axis direction 216 at the end of the path.

FIG. 2C shows a curved path, in which the tip 210 of the tool 202 is moved along a curve 220.

Other possible path forms include positioning the tool at a point, moving the tool along a sequence of lines known as a polyline, moving the tool along a spiral or helical curve, moving the tool along a polynomial curve, such as a quadratic Bezier curve or a cubic Bezier curve, or a sequence of polynomial curves known as a piecewise polynomial curve to name but a few. Any form of path that can be simulated can be considered, including a path defined by a procedure such as a path that is influenced by the shape or material composition of the workpiece.

Distance Fields

The distance field, d(p), of an object is a scalar field whose value at a point p in space is the distance from p to the surface of the object. Many possible distance fields are known in the prior art, but the most common is a Euclidean distance field where the distance field value at p is the minimum straight line distance from p to the surface of the object. Additionally, a distance field may be signed to distinguish the outside, inside and boundary of the object, e.g., the d(p)>0 inside, d(p)<0, and d(p)=0 at the surface.

Also a gradient vector of the distance field at p points in the direction of the minimum distance, and at the surface of the object the normalized gradient vector is equal to the normal vector of the surface. Distance fields are a form of implicit functions, and are an effective representation for rendering and editing shapes.

The point p in space that is of particular interest is a point where a value for distance field d equals zero, i.e., d=0. As referred herein, the set of points where the distance field is zero, i.e., the zero isosurface of the distance field, is a boundary of the object, e.g., the boundary of the workpiece, or the boundary of the swept volume.

Adaptively sampled distance fields (ADFs) use detail-directed sampling to provide a space and time efficient representation of the distance fields. ADFs store value samples of the distance field in a spatial hierarchy of cells, such as an octree. A spatial hierarchy of cells is a tree data structure wherein an initial node called the root cell encloses the entire volume of the ADF. Cells of the spatial hierarchy may be terminal leaves of the tree data structure, i.e., leaf cells, or may contain smaller child cells, such cells are called intermediate cells. The leaf cells of the spatial hierarchy may be labeled as interior leaf cells, i.e., completely interior to the boundary, exterior leaf cells, i.e., completely exterior to the boundary, or boundary leaf cells, i.e., containing the boundary of the object. Each cell is characterized by a size and position that allows the vertices at the corners of the cell to be readily computed, and hence a bounding box for the cell is defined.

Associated with each cell in the spatial hierarchy is the address or index in a memory or table of both the parent cell and any child cells. This gives rise to the common description of the spatial hierarchy of cells as a family tree, wherein a cell has ancestors, reaching back through the cell's parent cell and grandparent cell to the root cell, and a cell may have descendent cells such as children cells and grandchild cells until the leaf cells are reached.

Access to the information within the spatial hierarchy of cells is usually obtained through a method of recursion wherein the information query begins at the root cell and then recurse, or branches, to descendent cells by choosing a particular branch, i.e., child cell, of the tree data structure depending on some condition. For example, a method to find the leaf cells that contains a particular point in space starts with the root cell and then recurses to the child cell of each descendent cell that contains the point until the leaf cell that contains the point is reached.

Each cell in the spatial hierarchy of cells may contain distance data and a reconstruction method for reconstructing the portion of the distance field associated with the cell. Distance data can include the value of the distance field, as well as gradients and partial derivatives of the distance field at a set of points within the cell, e.g., at the vertices of the cell's bounding box. The distance field at any point within the cell may be reconstructed from the distance data as needed to reduce memory and computation requirements.

ADFs can be used to simulate machining using CSG operations. The workpiece to be machined and the tool can be represented as ADFs. The simulated machining process can generate an ADF of the simulated workpiece explicitly, for example by modifying an ADF of the workpiece. In this case the distance data associated with a cell may be modified by simulated machining, but the reconstruction method can remain constant.

Alternatively, the simulated workpiece can be represented implicitly as a composite ADF. Unlike the conventional ADF described above, a composite ADF does not store distance field value samples within each cell. Instead the composite ADF stores, within a spatial hierarchy of cells, a set of parameters for each cell needed to compute, by analytic or numerically means, the exact values of the distance fields at any point within the cell. The stored parameters can include, for example, a set of indices into an array of machining tools, which array the type, shape and relevant dimensions of the tool. Additionally the stored parameters can include, for example, a set of indices into an array of motions, which provides a type of the motion, the starting and ending point of the motion and any other useful information. Additionally the stored parameters can include, for example, operators used to combine the distance fields, such as CSG subtraction for machining simulation. The parameters can be used to determine reconstruction functions that can be used in combination to compute or reconstruct the swept volume distance field within the cell. A swept volume distance field is defined to represent the swept volume generated by moving the machining tool along the path, where the swept volume distance field is defined in a continuous manner according to a swept volume reconstruction method. The swept volume reconstruction method can reconstruct the swept volume distance field at a sample point.

FIG. 3 shows a 2D composite ADF 300 that includes a spatial hierarchy of cells, e.g., 301, 302 and 303, representing portions of the volume of the workspace as well as distance fields whose boundaries are indicted. In this example, the boundaries of distance fields 304-307 are planes that defined the boundary of the initial workpiece. Distance fields 308-310 are the boundaries of three distance fields representing sweeps of a ball end tool 106. Each cell in the composite ADF is associated with a subset of the set of distance fields representing the original workpiece and the swept volumes of the tool. For example, the subset of the set of distance fields associated with cell 311 includes distance fields 304, 308, and 309 that together determine the composite ADF surface within cell 311. Also associated with the cell is a procedural reconstruction method, such as CSG difference, for combining the subset of the set of distance fields to reconstruct the composite distance field of the workpiece. The composite surface is defined to be the simulated boundary of the workpiece including patches of the boundaries of the original workpiece distance fields and the swept tool distance fields.

It is preferred that the stored distance field parameters for each cell includes only references to distance fields that actually form the composite boundary of the machined workpiece, rather than include references to all distance fields in the simulation, or all distance fields that have a portion of their boundary within the cell. By this means the number of calculations needed to perform geometric operations, e.g., rendering, can be minimized.

Rendering of Composite ADFs

Rendering of composite ADFs employs some methods and terminology common to all 3D computer graphics. Rendering of 3D objects into an image involves a number of coordinate systems related by transformation matrices. As shown in FIG. 4 composite ADF 401, whose origin and orientation are shown by axis lines 402 can be defined within a homogeneous world space coordinate system, hereafter world space, whose origin and orientation are given by axes lines 403. World space coordinates often employ real dimensions such as millimeters or miles and a 4×4 matrix called an ADF matrix can be used to map ADF coordinates to world space coordinates. A virtual camera 404, at some position and orientation relative to the world space coordinates, defines an eye space coordinate system whose origin and orientation are given by axes lines 405. Coordinates of points in world space can be transformed into eye space using a 4×4 viewing matrix.

Associated with the camera is a viewing frustum 406 that delimits the portion of world space that can be seen by the camera. If the camera model uses prospective projection to replicate the common experience that farther objects appear smaller than nearer objects, then the viewing frustum is in the shape of a truncated pyramid 406. The apex angle of the frustum is determined by the camera's field of view. There are alternative projection transformations such as orthographic project wherein the viewing frustum is rectangular in shape.

The 4×4 projection matrix can be used to transform from eye space coordinates to clip space coordinates. The minimum depth 407 and maximum depth 408 of the viewing frustum are conventionally known as the near and far clipping planes, respectively.

All of the 3D objects within the viewing frustum can be visible in the rendered image 409. The transformation from clip space to the screen space is determined by a viewport matrix that defines the image origin and image width and height in units of pixels. The image 409 can include several memory arrays known as frame buffers that have storage for various values associated with each image pixel. The most essential of these is a color buffer that holds the red, green and blue color components, and possibly the transparency or alpha, of each pixel. Prior to rendering the image, the color buffer is usually cleared to a chosen background color, for example black, to remove any color values associated with an earlier use of the buffer.

Another commonly used buffer is the z buffer which holds a depth associated with each pixel in screen space, such that an object at the near clipping plane has a depth of 0.0 and at the far clipping plane has a depth of 1.0, e.g., the depth is normalized to the range [0, 1]. The function of the depth buffer is to enable correct occlusion in the rendered image as described below. Prior to rendering the image the z buffer is usually cleared to some large depth value, typically 1.0.

The rendering of a composite ADF as an image can be performed by a number of methods, for example object-order ray casting or image-order ray casting as shown schematically in 2-D in FIG. 4. For example, during image-order ray casting method, rays are computationally emitted from each pixel in the image and propagated through the viewing frustum until the rays either intersect the boundary of the composite ADF, or reach the far clipping plane of the view frustum. A ray can be equivalent to a parametric line with a time-like coordinate t such that a position of the ray in 3D space is defined by $R(t)=R_0+R_d t$ where $R_0$ is the origin of the ray and $R_d$ is the direction vector of the ray. The rays are propagated through the composite ADF by first finding the closest cell having a lowest t that the ray intersects. If the closest cell is an intermediate cell, then the child cells of the intermediate cell are recursively tested for ray intersection until the ray intersects the closest leaf cell. If the leaf cell is not a boundary leaf cell, then the cell does not include the boundary of the composite ADF. The method then looks for a next leaf cell along the ray.

As an example, a ray 411 propagates through the viewing frustum without intersecting any cells. Hence, pixel corresponding to the ray 411 remains set to the background color. Ray 412 intersects the root cell of the spatial hierarchy. In this example the root cell is an intermediate cell and all immediate children. Eventually the recursion reaches cell 425 which is an exterior leaf cell. The method then searches for the next cell along ray 412. In this example, there are no other cells so the pixel corresponding to the ray 412 remains with the background color.

Now consider ray 413 which is associated with a screen pixel 414. After intersecting several intermediate and exterior leaf cells, the ray 413 intersects cell 415 which is a boundary leaf cell and is shown enlarged in the inset of FIG. 4. Cell 415 includes the boundaries of distance fields 416, 417, and 418, wherein 416 is a planar distance field representing the original workpiece surface, and 417 and 418 are the boundaries of distance fields corresponding to two sweeps of a ball end tool 106. The process of determining if a ray intersects the boundary of the composite ADF within a cell can involve first determining the ray coordinate, $t_{front}$ and $t_{back}$, of the intersection of the ray with the front boundary face 419 of the cell and back boundary face 420 of the cell, respectively. If $t_{front} > t_{back}$, then the ray has missed the cell and the next ray is processed.

For rays that intersect the cell, the second step of image-order ray casting can begin by determining the points of intersection 421, 422, and 423, where, e.g., the ray 413 intersects the boundaries of distance fields 418, 416 and 417, respectively, associated with cell 415. Due to the subtractive nature of simulation a point p is only on the surface of the composite ADF. The point p is on the boundary of one distance field and inside of all of the others, i.e., if and only if $d_i(p)=0$, $d_j(p)>0$ for $i,j \in [0, N)$, $i \neq j$, where N is the number of distance field boundaries within the cell. Therefore, the values of the distance fields 416-418 can be determined for the intersection points 421-423 and the point with the minimum value of the ray parameter t that meets the above condition is the composite ADF surface point for that ray. In this example, the point 423 meets the condition and is known as a pixel fragment in the terminology of 3D computer graphics.

After the pixel fragment, e.g., the point 423, is determined, the normal vector of the surface is computed from the gradient of the distance field. The color and brightness of the pixel associated with the ray are determined from the material properties of the surface, e.g., ambient, diffuse and specular colors, plus material shininess, usually modified by using a lighting model, e.g. Phong or Blinn, that takes account of the dot product of the surface normal vector with a lighting vector as well as the light color. Typically, Phong lighting is used for plastics and, Blinn lighting is used for metals. Finally, the color and z value of the fragment are written into the color and z buffers, respectively.

The coordinates of fragments of the ADF or composite ADF are usually processed in a screen or image coordinate system. However, one skilled in the art will readily recognize that the coordinates of the fragment can be transformed from screen space back to world space by an inverse transformation that makes use of the mathematical inverses of the viewport, projection and viewing transformation matrices. The coordinates of the fragment in the world coordinate system corresponds to the surface of the ADF in the world coordinate systems.

Boundary Representations

A composite ADF is not the only possible representation of solid objects. The most common representation, used in most CAD software, is a boundary representation, or B-rep. A b-rep is a representation of an object by a set of non-lapping faces whose union represents the boundary of the object. A boundary representation has two parts, a topological description of the connectivity and orientation of vertices, edges and faces, and a geometric description for embedding these surface elements in space. A triangle mesh, commonly used in computer graphics, is an example of a boundary representation. In a triangle mesh each face is a triangle that is bounded by 3 edges that connect 3 vertices. A table, containing the positions of the all the vertices of the triangle mesh in world space, provides the geometric description of the boundary representation and a second table, wherein each entry is the indices of the 3 vertices that form a triangle of the triangular mesh, provides the topological description of the boundary representation.

Boundary representations are required to be closed, that is, the boundary representation must not have any gaps or holes. Additionally, the b-rep must be topological correct, that is, the b-rep must not have any dangling edges or faces that do not join other edges or faces to form a closed surface.

FIG. 5 shows an example conventional boundary representation of a tetrahedron. The tetrahedron can be described by four vertices, six edges and four triangular faces as follows: the vertices are 501, 502, 503, and 504; an edge 511 is a straight line with end vertices 501 and 502; an edge 512 is a straight line with end vertices 502 and 503; an edge 512 is a straight line with end vertices 502 and 503; an edge 513 is a straight line with end vertices 503 and 504; an edge 514 is a straight line with end vertices 501 and 504; an edge 515 is a straight line with end vertices 502 and 504; a face 520 is a triangle bounded by edges 512, 513, 515; a face 521 is a triangle bounded by edges 511, 515, 514; a face 522 is a triangle bounded by edges 511, 516, 512; and a face 523 is a triangle bounded by edges 513, 516, 514.

The boundary representation explicitly stores the boundary surfaces of the object. However, the side of a face that points toward the interior of the object is implicitly determined by the ordering of the vertices in the faces. In this example, a common right-hand ordering is used, in which the fingers of the right hand are oriented in the direction of the ordering of the vertices and the thumb points in the outward direction of the face. A method for determining if a point in space is interior or exterior to the boundary representation is to fire a ray from the point and count the number of faces that the ray intersects before reaching some large distance sufficiently great to be guaranteed to be outside the boundary representation. If the number of intersected faces is even, the point is outside the boundary representation, otherwise the point is inside.

A boundary representation is not limited to straight edges and flat faces. A boundary representation may also include, for example, parametric curves and faces such cubic B-splines and Bézier patches, respectively. These higher-order curves and surfaces enable solids with free-form boundaries to be represented in a compact way.

The rendering of boundary representations can be performed by 3D graphics hardware using a graphics application programming interface (API), such as OpenGL, and involves the same coordinate system and transformations that were describe above in the context of rendering composite ADFs. Each face of the boundary representation is rendered separately in an object-order fashion.

During rendering each face of the boundary can be converted into one or more flat polygons that can be passed to the graphics API. The graphics processor can transform the positions of the polygon vertices from world space to eye space by multiplication with the viewing transformation matrix, and then further transforms the positions to the clip space by multiplication by the projection matrix.

Additionally, a vector normal to the surface defined at each vertex is transformed by the transpose of the inverse of the upper 3×3 matrix of the viewing matrix. Clipping then occurs by discarding any faces that are not entirely within the clip volume $(x, y, z) \in [-1, 1]$. Any faces partially within the clip volume are clipped to the volume boundary. Vertices are then projected into screen space using a viewport matrix. Their $(x, y, z)$ coordinates are now in the range of [0, screen_width) and [0, screen_height), and [0.0, 1.0] respectively. The transformed face is then rasterized; for each pixel within the screen region bounded by the transformed face a fragment of the boundary representation is generated whose position and color are determined by bilinear interpolation of the positions and colors of the face vertices. A z test is performed wherein the z value of each fragment is compared to the value already in the z buffer and if the value is less, i.e., closer, then the current z value and color are overwritten by the fragment values, and otherwise the fragment is discarded.

The normal vector can be determined for each fragment from the transformed normal vector defined at each vertex and interpolated to the screen position of the fragment. The color and brightness of the fragments can be determined from the material properties, e.g., ambient, diffuse and specular colors, plus material shininess, usually modified by using a lighting model, e.g. Phong or Blinn, that takes account of the dot product of the interpolated transformed normal vector with a lighting vector as well as the light color.

Many workpieces used in machining begin as simple shapes, such as rectangular solids or cylinders. However, another class of machining operations involves the finishing of cast workpieces. A cast workpiece, or casting, is produced by pouring molten metal into a mold to form a more complex initial workpiece. A common mold material is sand which is mixed with a weak adhesive and has itself been cast into a sand mold from other molds. Sand has the advantage of being inexpensive and heat resistant, and the finished casting can be easily extracted from the sand mold by simply breaking the sand apart.

Due to the relatively course texture of the sand a sand casting has a rough finish, and low dimensional accuracy. However, some surfaces of the workpiece need to have a smooth finish and high accuracy dimensions. For example, an automobile engine block is produced by sand casting and must be very accurate and smooth within the cylinders so that the piston rings can seal the cylinder, and the piston move correctly. Likewise, mounting holes must be tapped and sealing surfaces, where gaskets join separate components, must have a smooth and flat finish.

To achieve smooth surfaces and accurate dimensions some, or all, of the surfaces of the casting must be machined. Therefore it is important that a machining simulator is able to begin with a representation of the cast workpiece. However, a surface representation of the cast workpiece can be incompatible with representations of the motions of the tool. For example, the surface of the cast workpiece can be defined by explicit representation, e.g., a CAD boundary representation, and the motions of the tool can be defined by a surface having implicit representation, e.g., ADF representation.

The conventional methods convert an implicit object representation to explicit representation, or vice versa. However, the conversion process is time consuming and may have large memory requirements. Also, in the case of free-form surfaces, the conversion may result in a loss of accuracy. Accordingly, there is a need in the art to address abovementioned problems.

SUMMARY OF THE INVENTION

It is an object of the invention to provide a method simulating machining an object by a tool. It is further object of the invention to provide such a method that provides a machining simulation of a model of an object without modifying the model itself. It is further object of the invention to provide a method suitable for machining simulation of an object having one type of surface representation with a set of swept volumes having another type of surface representation.

Some embodiments of the invention are based on a realization that instead of machining simulation of the model of the object having, e.g., a boundary representation of a surface, with swept volumes in, e.g., distance field representation, a proxy object in distance field representation can be created and the machining simulation can be performed on that proxy object to receive a machined proxy object. Now the problem of machining the model of the object is reduced to determining a Boolean intersection between the machined proxy object and the model of the object.

Moreover, some embodiments are based on another realization, that for some applications, it is unnecessary to convert one representation into the other. Instead, it is sufficient to co-render the different representations so that the representations are correctly composited with each other. The co-rendering of the two representations produces an image that represents machining simulation including proper occlusion.

Accordingly, one embodiment of the invention discloses a method for computer simulation of a machining of an object by a motion of a tool, wherein the object is represented by a boundary representation (BP) object, wherein the BP object includes a boundary representation of a surface of the object, wherein the motion is represented by a set of swept volumes, wherein the set of swept volumes includes a first set of implicit functions defining a surface of the set of swept volumes. Steps of the method are executed by a processor. The method includes determining a proxy object having a second set of implicit functions defining a surface of the proxy object; simulating the machining of the proxy object with the set of swept volumes to produce a machined proxy (MP) object having a third set of implicit functions defining a surface of the MP object; rendering an image of a Boolean intersection between the MP object and the BP object; and storing the image into a memory.

Variations of this embodiment may include following optional features. For example, the rendering may be performed from a viewing direction, and an implicit function may be selected from a group consisting of: a distance field, a sampled distance field, an adaptively sampled distance field, a composite adaptively sampled distance field, and combinations thereof.

Also, a surface of the BP object may include BP object fragments in a world coordinate system, wherein a surface of the MP object includes MP object fragments in the world coordinate system. The rendering may further includes determining a set of BP object fragments internal to the MP object; determining a set of MP object fragments internal to the BP object; and converting the set of BP object fragments and the set of MP object fragments into a set of pixels in an image coordinate system forming at least part of the image.

The determining the set of BP object fragments may include determining a distance from a BP object fragment to the surface of the MP object, wherein the distance is determined in the world coordinate system; adding the BP object fragment in the set of BP object fragments, if the distance indicates that the BP object fragment is internal to the MP object; and adding the BP object fragment in the set of machined BP object fragments, if the distance indicates that the BP object fragment is external to the MP object.

The determining the set of MP object fragments may include determining a depth of a MP object fragment in the image coordinate system; and adding the MP object fragment in the set of MP object fragments, if the depth is within at least one range of depths internal to the BP object, wherein the range of depth is determined in the image coordinate system.

Additionally or alternatively, the determining the set of MP object fragments may include determining MP object fragments corresponding to BP object fragments in the set of machined BP object fragments; determining a depth of each corresponding MP object fragment in the image coordinate system; and adding the corresponding MP object fragment in the set of MP object fragments, if the depth is within at least one range of depths internal to the BP object, wherein the range of depth is determined in the image coordinate system; and determining a correspondence between the MP object fragment and the BP object fragment of the set of machined BP object fragments in the image coordinate system.

In some variations, the method may also include setting a pixel flag for a pixel corresponding to the BP object fragment of the set of machined BP object fragments, such that the pixel flag determines the correspondence between the MP object fragment and the BP object fragment. Additionally or alternatively, the method may include setting a face flag for at least one face of the BP object corresponding to the BP object fragment of the set of machined fragments to produce at least one machined face; and determining the range of depths internal to the BP object only for the machined face.

In one variation of this embodiment, the method includes determining, in a world coordinate system, BP object fragments on a surface of the BP object; determining, in the world coordinate system, a set of BP object fragments internal to the MP object and a set of machined BP object fragments external to the MP object; determining, in the image coordinate system, a set of machined faces of the BP object, each machined face corresponds to at least one BP object fragments in the set of machined BP object fragments; determining, in the image coordinate system, a set of ranges of depths internal to the BP object, wherein at least one range of depth is determined for at least one machined face; determining, in the world coordinate system, MP object fragments on the surface of the MP object; determining, in the image coordinate system, MP object fragments corresponding to BP object fragments in the set of machined BP object fragments; adding a corresponding MP object fragment in the set of MP object fragments, if a depth of the corresponding MP object fragment, in the image coordinate system, is within at least one range of depths from the set of ranges of depths; and converting the set of BP object fragments and the set of MP object fragments into a set of pixels in an image coordinate system forming at least part of the image. The above embodiments can be implemented using a processor.

Another embodiment of the invention discloses a computer system for performing a computer simulation of a machining of an object by a motion of a tool, wherein the object is represented by a model of the object, wherein the motion is represented by a set of swept volumes, including a processor configured for determining a proxy object, such that a shape of the proxy object at least circumscribes a shape of the model of the object; simulating the machining of the proxy object with the set of swept volumes to produce a machined proxy object; and rendering an image of a Boolean intersection between the machined proxy object and the model of the object.

In the computer system, a representation of a surface of the model of the object and a representation of a surface of the set of swept volumes may be different types of representations or the same type of representation.

Another embodiment discloses a computer program product for performing a computer simulation of a machining of an object by a motion of a tool, wherein the object is represented by a boundary representation (BP) object, wherein the BP object includes a boundary representation of a surface of the object, wherein the motion is represented by a set of swept volumes, wherein the set of swept volumes includes a first set of implicit functions defining a surface of the set of swept volumes, including computer readable storage medium comprising computer usable program code embodied therewith, wherein the program code configured for: determining a proxy object having a second set of implicit functions defining a surface of the proxy object; simulating the machining of the proxy object with the set of swept volumes to produce a machined proxy (MP) object having a third set of implicit functions defining a surface of the MP object; rendering an image of a Boolean intersection between the MP object and the BP object; and storing the image into a memory.

The computer program product may have the program code also configured for: determining, in a world coordinate system, BP object fragments on a surface of the BP object; determining, in the world coordinate system, a set of BP object fragments internal to the MP object and a set of machined BP object fragments external to the MP object; determining, in the image coordinate system, a set of machined faces of the BP object, each machined face corresponds to at least one BP object fragments in the set of machined BP object fragments; determining, in the image coordinate system, a set of ranges of depths internal to the BP object, wherein at least one range of depth is determined for at least one machined face; determining, in the world coordinate system, MP object fragments on the surface of the MP object; determining, in the image coordinate system, MP object fragments corresponding to BP object fragments in the set of machined BP object fragments; adding a corresponding MP object fragment in the set of MP object fragments, if a depth of the corresponding MP object fragment, in the image coordinate system, is within at least one range of depths from the set of ranges of depths; and converting the set of BP object fragments and the set of MP object fragments into a set of pixels in an image coordinate system forming at least part of the image.

BRIEF DESCRIPTION OF THE DRAWINGS

FIGS. 2A-2C are schematics of conventional different paths of a tool;

FIGS. 6A, 6B and 6C are schematics of simulating machining according some embodiment of the invention;

DETAILED DESCRIPTION OF THE PREFERRED EMBODIMENT

Figure 1A:
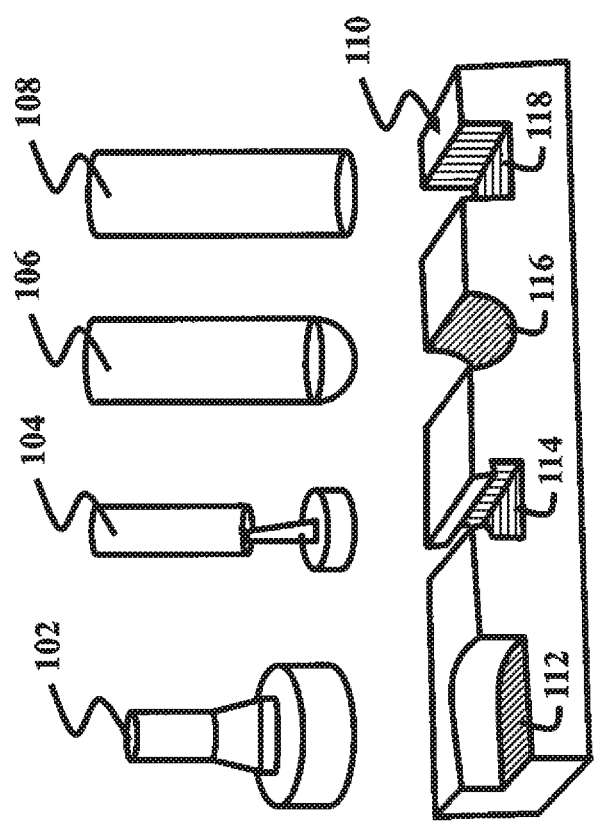
FIG. 1A is a schematic of example tools used for machining an object, and a conventional representation of a portion of a workpiece.
Figure 1B:
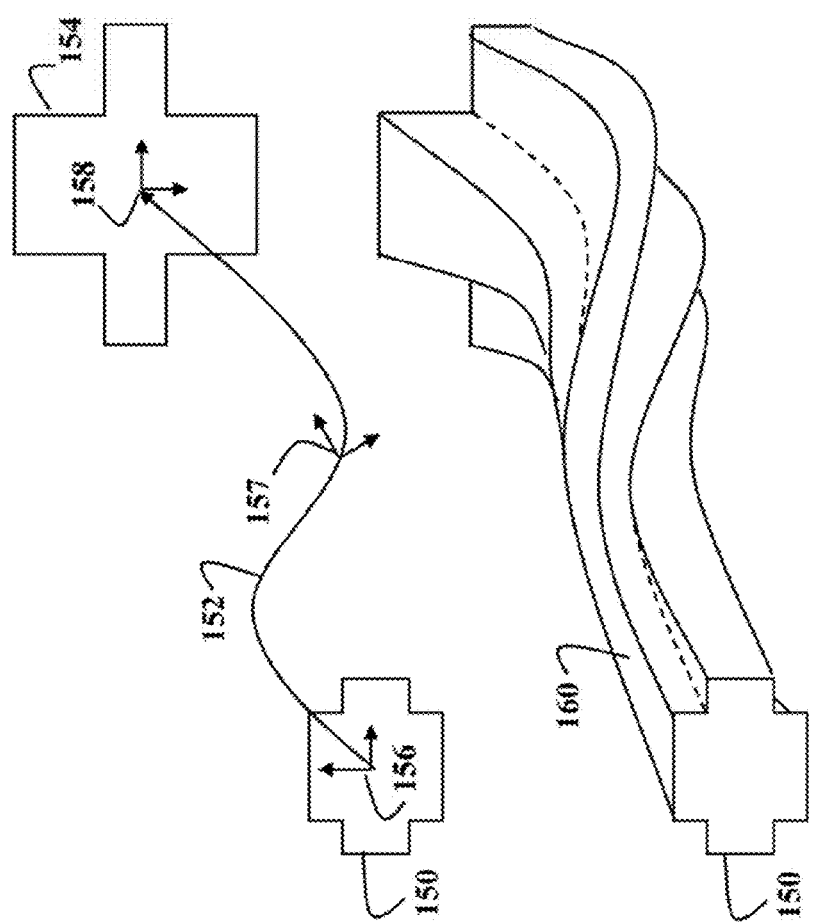
FIG. 1B is a schematic of a swept volume determined by sweeping a 2D shape along a curved path.
Figure 3:
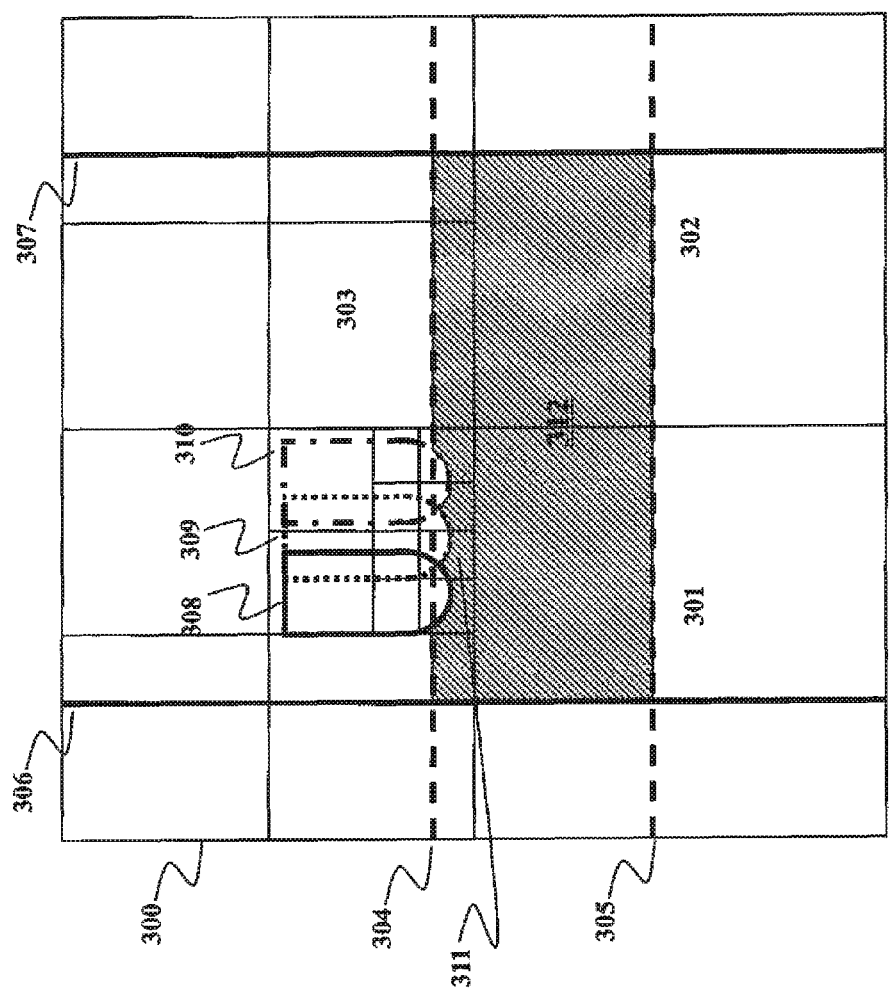
FIG. 3 is a schematic of a conventional composite ADF representing a machined workpiece.
Figure 4:
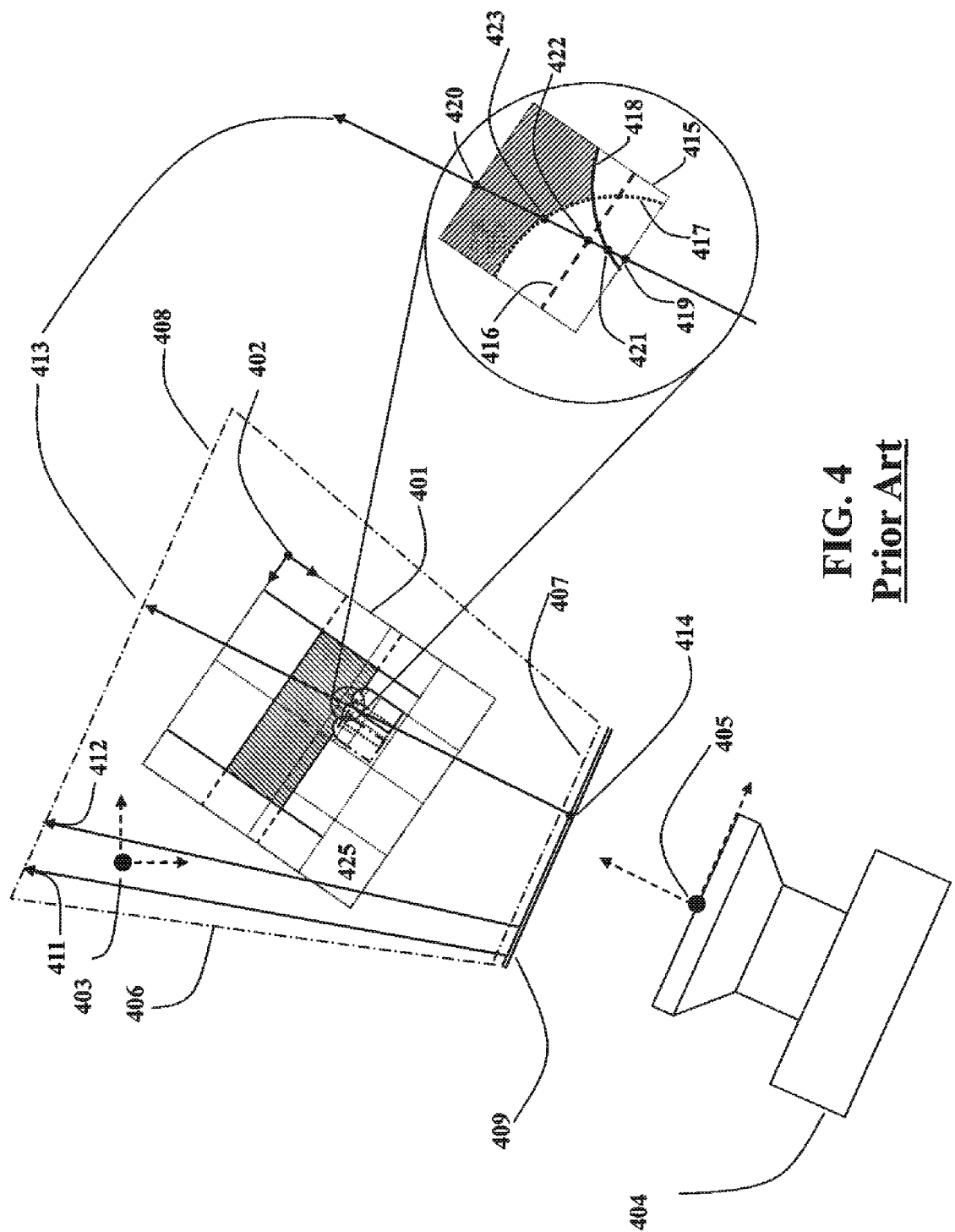
FIG. 4 is a schematic of conventional rendering a composite ADF by image-order ray casting.
Figure 5:
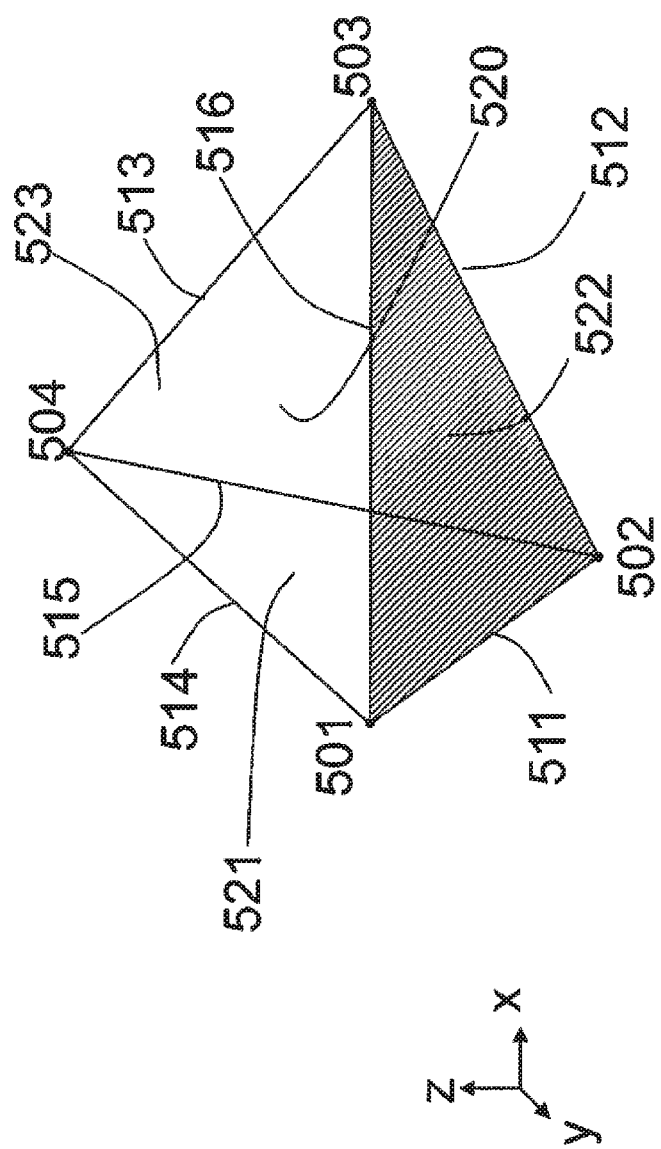
FIG. 5 is a schematic a conventional boundary representation of a tetrahedron.

The embodiments of the invention provide a method for simulating numerically controlled (NC) machining, e.g., turning, boring, drilling, broaching, sawing, shaping, reaming, milling, tapping, grinding.

Typically, either the object can be fixed, and only the tool moves, or the tool can be fixed and only the object moves or both move as in turning with a lathe, where the object rotates, and the tool moves linearly. Hence, the term "motion" refers to the relative motion between the object and the tool.

In this description, we use milling as an example machining operation. However, it is understood that the invention is equally applicable to other machining operations.

FIGS. 6A-C illustrate a realization behind some embodiments of the invention. FIG. 6A shows a method for simulating a machining 620 of a model 610 of an object. Specifically, the model 610 is modified by a set of swept volumes 625 representing a motion of a tool to simulate a machined object 630. However, Applicants generally recognized that for some applications performing the machining 620 is undesirable. For example, the machining 620 may fail when the swept volume is represented implicitly with an implicit function, e.g., a distance field, and the model of the object is represented explicitly, e.g., with a boundary representation.

Applicants further recognized, that the machining 620 can be avoided using a proxy object 640, as shown in FIG. 6B. For example, the proxy object may have the same surface representation as a surface of the swept volume. Additionally or alternatively, the proxy object may have a shape that is more advantageous for machining simulation than a shape of the object. Thus, some embodiments of the invention apply 650 the set of swept volumes 625 to the proxy object to produce a machined proxy object 660.

Next, as shown in FIG. 6C, a Boolean intersection 670 between the model of the object 610 and the machined proxy object 660 produces an image of a machined object 680 that looks similar to the machined object 630 including proper occlusions. Moreover, the Boolean intersection can be determined during rendering of the model of the object and the machined proxy object into the image without the modification of the model of the object.

Accordingly, some embodiments of the invention, instead of performing machining simulation of the model of the object, perform the machining simulation of the proxy object. Hence, the problem of machining the model of the object is reduced to determining the Boolean intersection between the machined proxy object and the model of the object.

The proxy object separates the model of the object to be machined from the machining instructions, i.e., the set of swept volumes. Such separation enables to perform the machining simulation for arbitrarily types of the objects having different shapes and surface representations. In effect, the proxy object enables the machining simulation without providing the model of the object in advance. Moreover, the proxy object enables performing the machining simulation ones to produce the machined proxy object and reusing the machined proxy object for different objects to be machined.

Therefore, the usage of the proxy object reduces a cost of the simulation, while expanding applicability and flexibility of the machining simulation.

Various representations of the surface of the model of the object and the surface of the set of swept volumes are possible. For example, the surfaces can have an explicit representation, e.g., a boundary representation, or an implicit representation, e.g., using a set of implicit functions. The set of implicit functions can include implicit functions selected from a group consisting of: a distance field, a sampled distance field, an adaptively sampled distance field, a composite adaptively sampled distance field, and combination thereof.

In some embodiments of the invention, the representation of the surface of the model of the object and the representation of the surface of the set of swept volumes are different types of representations. In alternative embodiment, the representation of the surface of the model of the object and the representation of the surface of the set of swept volumes are of the same type of representation.

Also, in some embodiments, the proxy object is determined such that a shape of the proxy object at least circumscribes a shape of the model of the object. The shape of the proxy object is a solid shape, e.g., rectangular, cubical, and spherical. Other shapes of the proxy object are possible.

For example, in one embodiment, the proxy object represents a solid object with the same surface representation as the representation of the surface of the swept volume, wherein a shape of the proxy object at least circumscribes a shape of the BP object. In one variation of this embodiment, the proxy object has a rectangular shape.

Figure 7:
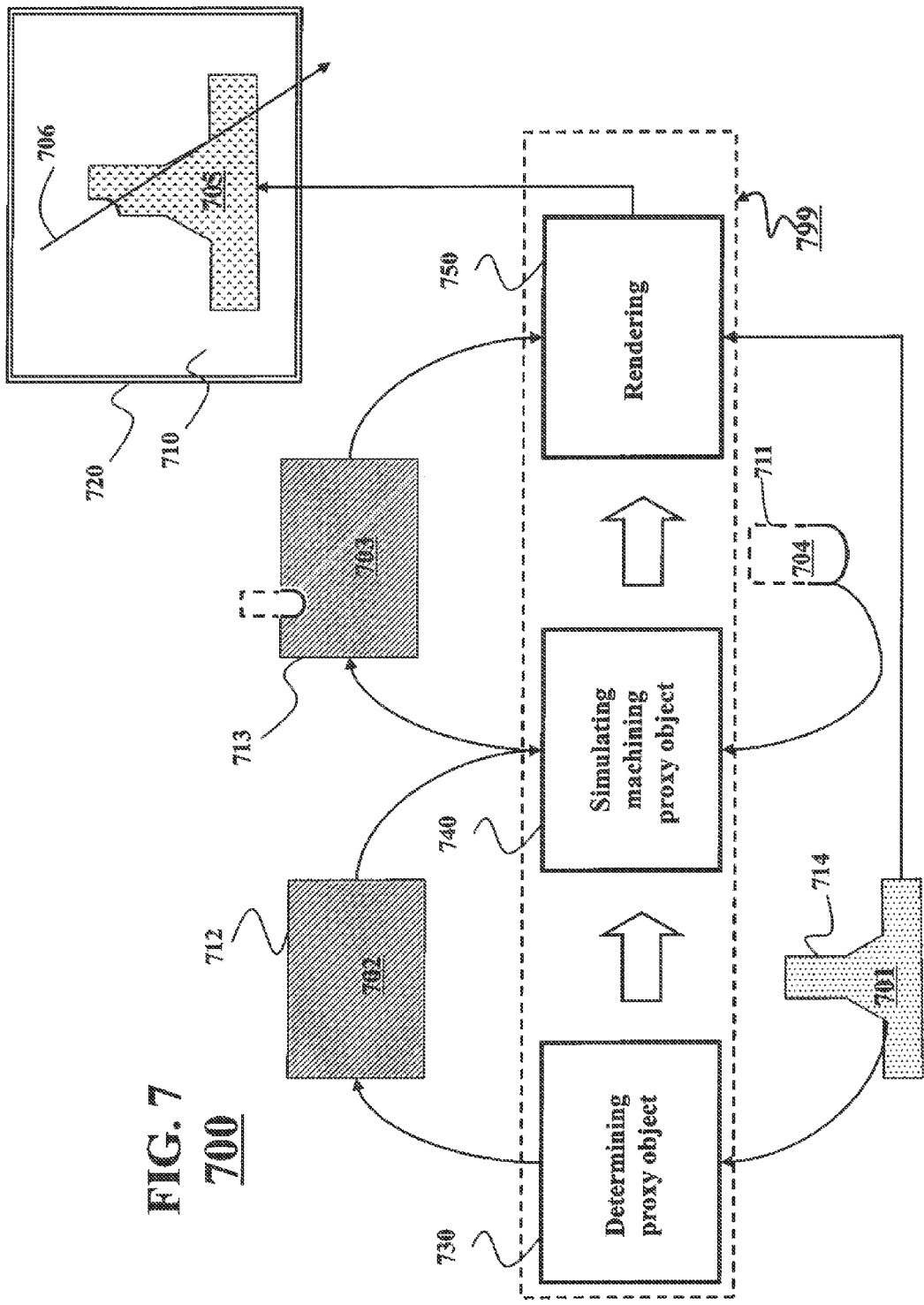
FIG. 7 is a block diagram of a method for simulating machining according some embodiments of the invention.

FIG. 7 shows a block diagram of a method 700 for simulating machining an object according to some embodiments of the invention. In these embodiments, the machining includes the machining of the object with a motion of the tool. The object is represented by a boundary representation (BP) object 701, wherein the BP object includes a boundary representation 714 of a surface of the object. The motion is represented by a set of swept volumes 704, wherein the set of swept volumes includes a first set of implicit functions 711 defining a surface of the set of swept volumes. However, this embodiment is provided for illustration purpose only, and is not intended to limit the scope of the invention.

At a beginning of the simulation of the machining of the BP object 701, a proxy object 702 is determined 730, wherein a second set of implicit functions 712 defines a surface of the proxy object. Next, the machining of the proxy object 702 is simulated 740 with the set of swept volumes 704 to produce a machined proxy (MP) object 703 having a third set of implicit functions 713 defining a surface of the MP object. A Boolean intersection 705 between the MP object 703 and the BP object 701 is rendered 750 into an image 710. Typically, the rendering 750 is performed from a viewing direction, such as a viewing direction illustrated by a ray 706. The image 710 represents a machined BP object as can be seen from the viewing direction 706. The image 710 can be stored in a memory 720 for storage or further processing.

The method 700 and/or other embodiments of the invention is executed by a processor 799. A "processor" or a "central processing unit (CPU)" refers to a computer or a component of a computer that reads and executes software instructions. As will be appreciated by one skilled in the art, embodiments of the invention may be embodied as a system, method or a computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "memory" or a "computer-readable medium" refers to any storage for storing data accessible by a computer. Examples include a magnetic hard disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM). Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The proxy object 702 may be, for example, an ADF of rectangular solid whose dimensions are larger than dimensions of the BP object 601, a shape of the proxy object at least circumscribes a shape of the BP object. In general, the Boolean intersection means that a point is only on the boundary of the Boolean intersection of two objects, if and only if, the point is on the boundary of one object and internal to the other object. The interior of Boolean intersection of the two objects is the region of space that is common to the inside region of both of the objects. Because the proxy object is larger than the BP object the region of space that is inside of both of the objects is equal to the region of space that is inside of the b-rep object alone.

Figure 8:
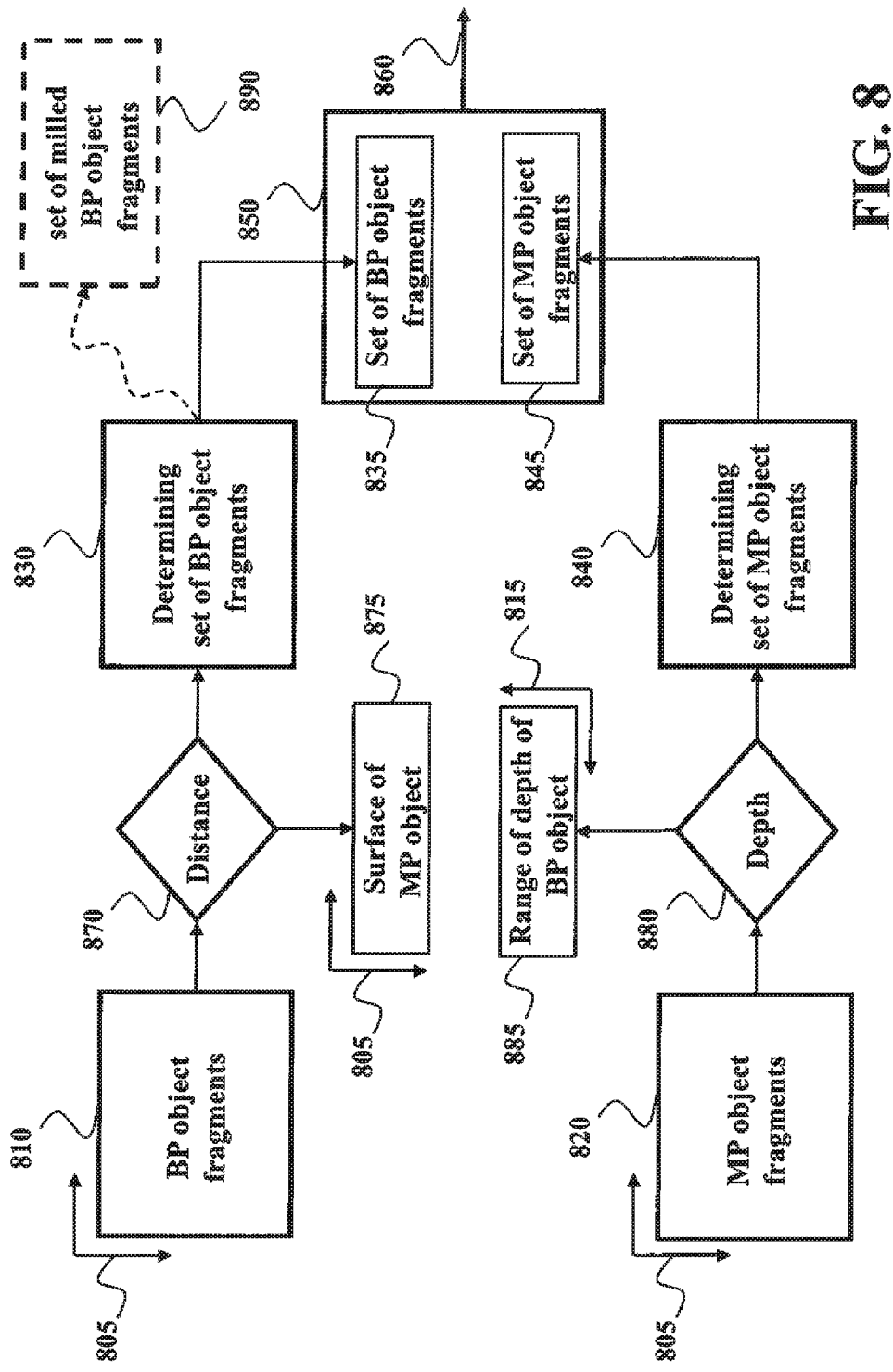
FIG. 8 is block diagrams of a method for rendering Boolean intersection in accordance with some embodiments of the invention.

The rendering 750 of the Boolean intersection 705 between the BP object and the MP object can be performed by a number of methods. Selection of the specific method may depend on the type of representation of the surfaces of the BP object and the MP object. For example, FIG. 8 shows a block diagram of a method for rendering 750 in accordance with some embodiments of the invention. The surface of the BP object includes BP object fragments 810 in a world coordinate system 805. Similarly, the surface of the MP object includes MP object fragments 820, also in the world coordinate system 805. Each BP object fragment and MP object fragment in the world coordinate system corresponds to a pixel of the image 710 in an image coordinate system 815.

A set of BP object fragments 835 internal to the MP object is determined 830. A BP object fragment is internal to the MP object, if the BP object fragment is on the surface of the MP object or inside the MP object. Otherwise, BP object fragment is external to the MP object.

Because the surface of the MP object is represented implicitly, it is possible to determine a distance 870 from the BP object fragment to the surface of the MP object. The distance is determined in a world coordinate system 805. One embodiment of the invention adds the BP object fragment in the set of BP object fragments 835, if the distance 870 indicates that the BP object fragment is internal to the MP object. Otherwise, BP object fragment is external to the MP object. Typically, a sign of the distance 870 indicates whether the BP object fragment is internal or external to the MP object. The sign can be positive or negative depending on a definition of the implicit function. If the distance 870 is zero, the BP object fragment is on the surface of the MP object, i.e., internal to the MP object.

Similarly, a set of MP object fragments 845 internal to the BP object is determined 840. A MP object fragment is internal to the BP object, if the MP object fragment is on the surface of the BP object or inside the BP object.

Because the surface of the BP object is represented explicitly, one embodiment of the invention performs the determination 840 in the image coordinate system 815. For example, a depth 880 of a MP object fragment is determined in the image coordinate system and the MP object fragment is added to the set of MP object fragments 845, if the depth 880 is within at least one range of depths 885 internal to the BP object.

Figure 10:
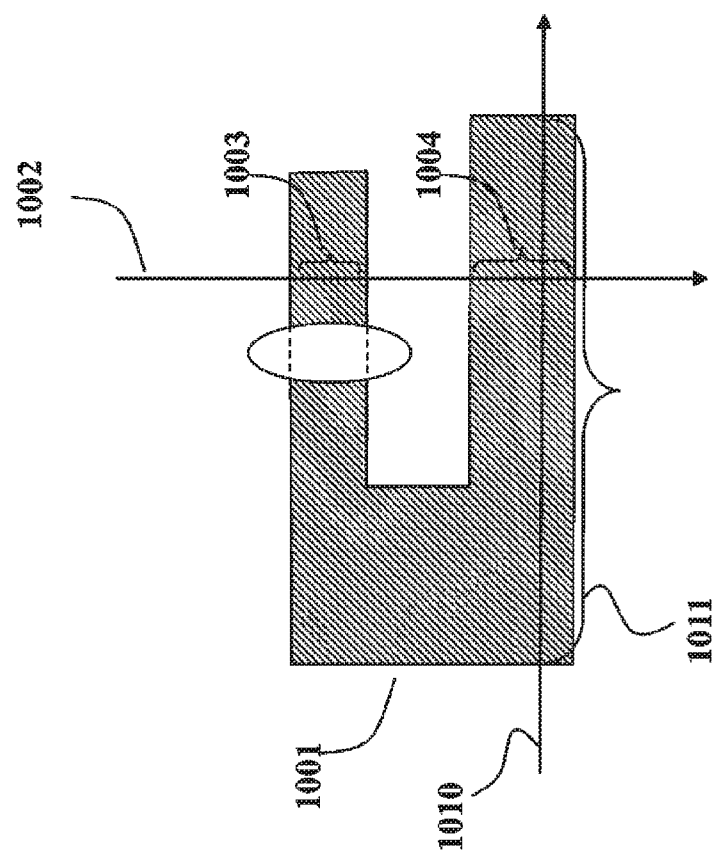
FIG. 10 is a schematic of range of depth of an object.

FIG. 10 shows an example of a BP object 1001 in the image coordinate system. Depending on the viewing direction, the BP object 1001 has different number of internal ranges of depth. For example, for the viewing direction 1002, there are two ranges of depths internal to the BP object, i.e., a range 1003 and a range 1004. For the viewing direction 1010, there is only one range of depth 1011.

Referring back to FIG. 8, the set of BP object fragments 835 and the set of MP object fragments 845 are converted 850 into a set of pixels 860 in an image coordinate system forming at least part of the image 710.

Some embodiments, the BP object fragment external to the MP object can correspond to MP object fragment that should be tested for the rendering of the Boolean intersection. Thus, one embodiment of the invention adds the BP object fragment in a set of machined BP object fragments 890, if the distance indicates that the BP object fragment is external to the MP object. In this embodiment, only MP object fragments corresponding to BP object fragments in the set of machined BP object fragments are tested for the selection into the set of MP object fragments. A correspondence between the MP object fragment and the BP object fragment of the set of machined BP object fragments can be determined in the image coordinate system. For example, one embodiment sets a pixel flag in an auxiliary frame buffer for a pixel corresponding to the BP object fragment of the set of machined BP object fragments, such that the pixel flag determines the correspondence between the MP object fragment and the BP object fragment.

In some embodiments, the rendering 750 are further accelerated by setting a face flag for at least one face of the BP object corresponding to the BP object fragment of the set of machined fragments to produce at least one machined face. In this embodiment, the range of depths internal to the BP object is determined only for the machined face.

Some embodiments of the invention use dual labeling, i.e., setting both the pixel flags and the face flags. This dual labeling greatly accelerates rendering by enabling the skipping of faces and pixels where it is certain that there can be no fragment in the image that come from the machined proxy object.

Figure 9:
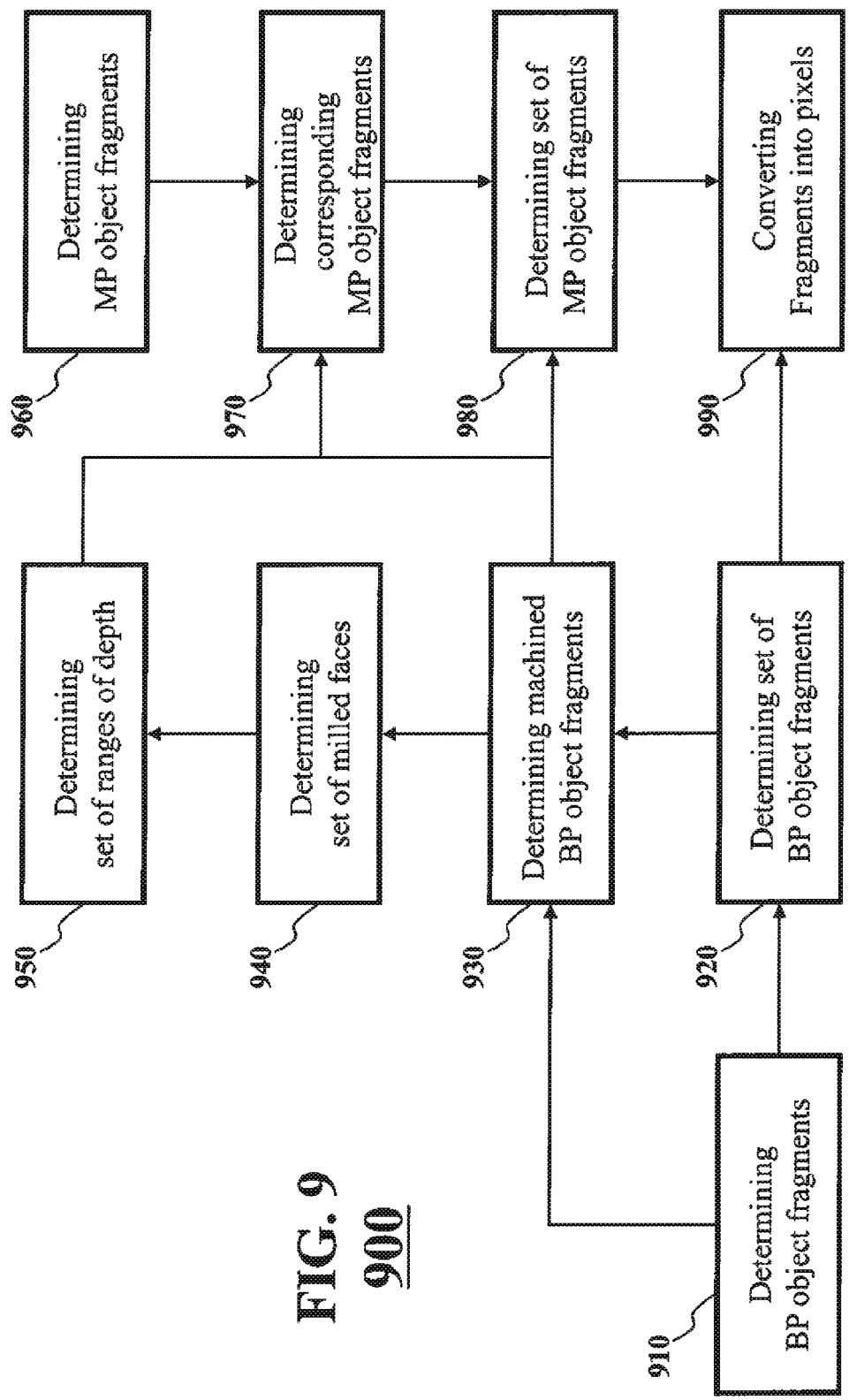
FIG. 9 is block diagrams of a method for rendering Boolean intersection in accordance with some embodiments of the invention.

FIG. 9 shows a flow chart of a rendering process 900 according to one embodiment of the invention. At step 910, BP object fragments on a surface of the BP object are determined in a world coordinate system. At steps 920, a set of BP object fragments internal to the MP object and, at step 930, a set of machined BP object fragments external to the MP object are determined in the world coordinate system. At step 940, a set of machined faces of the BP object are determined in an image coordinate system, such that each machined face corresponds to at least one BP object fragments in the set of machined BP object fragments. And at step 950, a set of ranges of depths internal to the BP object are determined in the image coordinate system, wherein at least one range of depth is determined for at least one machined face.

Also, at step 960, MP object fragments on the surface of the MP object are determined in the world coordinate system. At step 970, MP object fragments corresponding to BP object fragments in the set of machined BP object fragments are determined in the image coordinate system. Next, at step 980, a set of MP object fragments is determined by adding a corresponding MP object fragment in the set of MP object fragments, if a depth of the corresponding MP object fragment, in the image coordinate system, is within at least one range of depths from the set of ranges of depths determined in the step 950. Next, at step 990, the set of BP object fragments and the set of MP object fragments are converted into a set of pixels in an image coordinate system forming at least part of the image.

Example of Implementation

Figure 11:
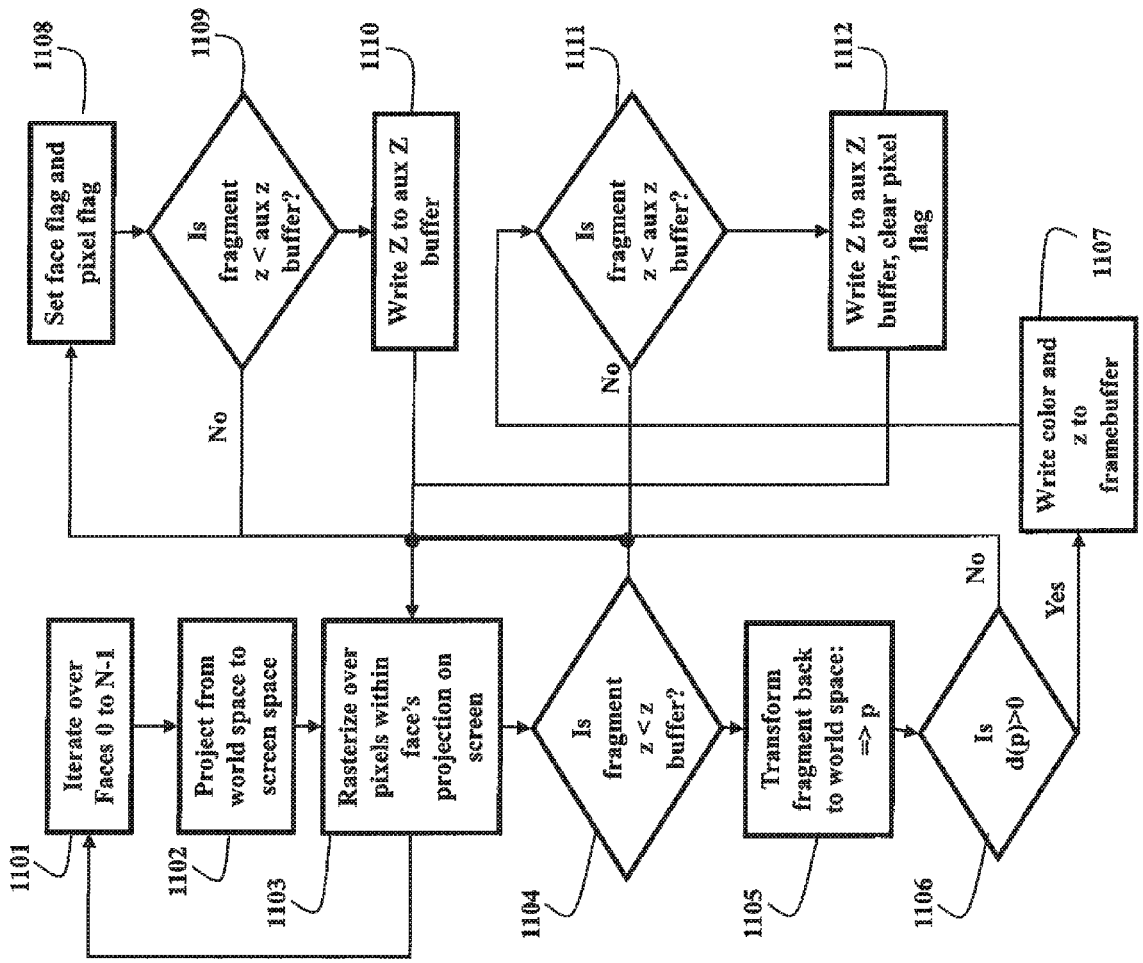
FIGS. 11-12 are flowcharts of a rendering process according to one embodiment of the invention.
Figure 12:
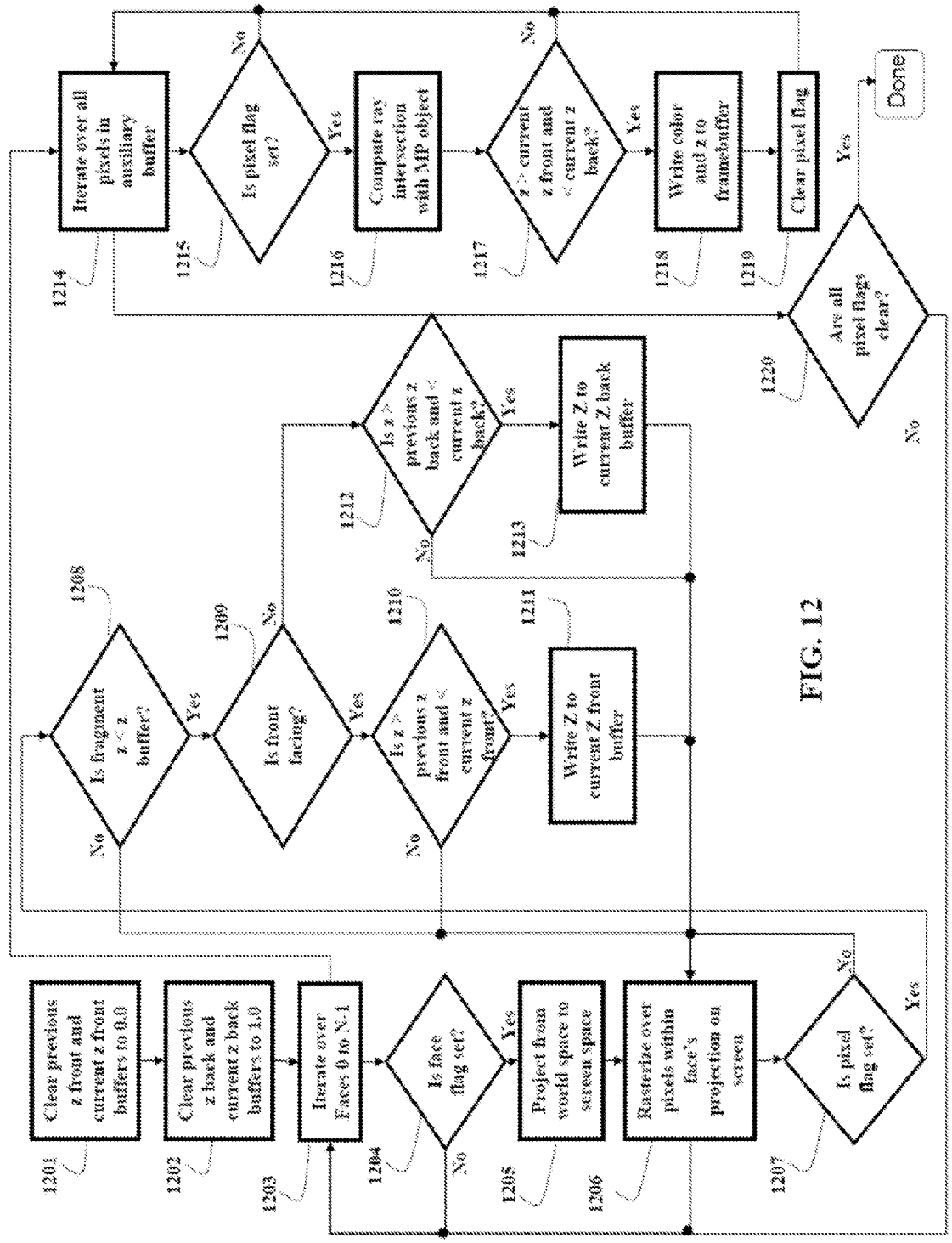

FIGS. 11-12 show flow charts of a specific, but not intended to be limited example of rendering process into an image according to one embodiment of the invention. The image is displayed on a screen of a display device having screen coordinate system. The rendering proceeds in two phases. In the first phase the BP object is rendered such that any BP fragments of the BP object having world space position external to the MP object are not added to a frame buffer of the image. In the second phase the rendering of the MP object is performed only for those pixels corresponding to BP object fragments external to the MP object, i.e., from the set of machined BP fragments.

FIG. 11 shows a flow chart of the first phase of the rendering. During the first phase, the method iterates 1101 over all of faces of the BP object. Each face is projected 1102 from world coordinate system to the screen coordinate system and then rasterized 1103 to determine a fragment corresponding to a location of a pixel in the image. Each fragment generated during rasterization 1103 is subjected to a z buffer test 1104 to determine a visibility of the fragment. Next, coordinates of the fragments in the screen coordinate system are transformed back 1105 to coordinates of the BP fragments in the world coordinate system. The value of the distance field of the MP object is determined and tested 1106 for coordinates of the BP fragments in the world coordinate system. If the sign of the distance field indicates that the BP fragment is internal to the MP object, then the fragment is on the boundary of the Boolean intersection of the BP object and the MP object. Therefore, the color and z value of the BP fragment of the BP object are written to the color and z buffers 1107, respectively. If the sign of the distance field of the MP object indicates that the BP fragment is external to the MP object, the color and z value of the BP fragment are not computed or added to the color and z buffers.

However, when the BP fragment is external to the MP object, it is possible that the surface that should be displayed for this pixel corresponds to the MP object. Therefore, two flags are set 1108 for a pixel corresponding to the external BP fragment. Specifically, a face flag is associated with each face of the BP object that includes the external BP fragment. Also, a pixel flag is set in an auxiliary frame buffer for each pixel that corresponds to the external BP fragment. The pixel flag indicates that for this pixel the MP object can be on the boundary of the Boolean intersection of the BP object and the MP object. Both flags are used during the second phase of the rendering. The face flag and the pixel flag occupy two complementary spaces of the rendering: the face flag is an object labeling and the pixel flag is an image labeling. This dual space labeling greatly accelerates rendering by enabling the skipping of the faces and the pixels where it is certain that there can be no fragment in the image that come from the MP object.

During the first phase of the rendering, the embodiment also stores, at least temporarily, the z value of external BP fragments in an auxiliary z buffer to obtain correct occlusion. For example, the rasterization 1103 of different faces of the BP object can produce BP fragments that correspond to the same pixel of the image. Some, but not necessarily all, of these BP fragments may be external to the MP object. However, a face that has been rasterized early may include the external BP fragment for a given pixel. This results in the pixel flag being set for that pixel. A BP fragment of a face rasterized later may override the BP fragment of the face rasterized earlier, and thus the pixel flag for that pixel has to be cleared.

Figure 13:
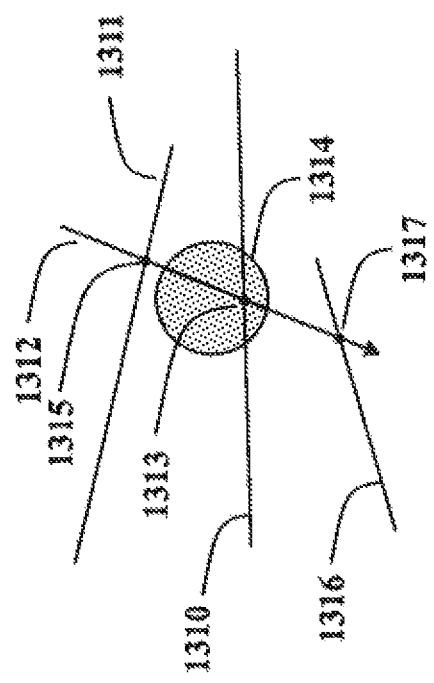
FIG. 13 is a schematic of some elements of the rendering process.

For example, referring to FIG. 13, a face 1310 is rendered earlier than face 1311 and when viewed from the direction indicated by arrow 1312 a BP fragment 1313 is generated. However, the BP fragment 1313 is outside the MP object 1314 whose outside is indicated by the stipple pattern. Hence, the BP fragment 1313 is outside the Boolean intersection of the BP object and the MP object and does not contribute to the image.

A BP fragment 1315 is generated from a face 1311 and is internal the MP object 1314 and also has a lower z than the BP fragment 1313 so the fragment is visible and is added to the frame buffer.

The auxiliary z buffer is used to distinguish from the case of face 1311 from that of the face 1316. Rasterization of face 1316 generates fragment 1317 that is also internal to the MP object just as the BP fragment 1313 is and is therefore potentially visible. However, in the case of fragment 1315 there is no possibility that fragment of the MP object is visible since the MP object is occluded by the face 1311. However, it is still possible that the MP object contributes a pixel that occludes the face 1316.

Referring to both FIG. 11 and FIG. 13, the z value of the external BP fragment 1313 is z tested against the value stored in the auxiliary z buffer 1109. If the z value of the BP fragment is less than the stored value, the z value of the BP fragment 1313 replaces 1110 the stored z value. A next internal BP fragment 1315 is z tested 1111 against the value in the auxiliary z buffer. If the z value of fragment 1315 is less than the stored z value, e.g., of the BP fragment 1313, the z value of fragment 1315 is stored in both the standard z buffer and the auxiliary z buffer, the color of the BP fragment 1315 is determined and stored in the color buffer, and the pixel flag is cleared 1312.

Alternatively, a next internal BP fragment such as the BP fragment 1317 is z tested against the value in the auxiliary z buffer 1111, which has the z value of fragment 1313 in this example. Since the z value of fragment 1317 is greater than the z value in the auxiliary z buffer, the z value of fragment 1317 is only stored in the standard z buffer and the color of fragment 1317 is determined and stored in the color buffer. The z value of fragment 1317 is not written to the auxiliary z buffer and the pixel flag is not cleared. In one embodiment, after first phase of the rendering is completed, the values of the secondary z buffer are discarded.

During the second phase of the rendering of the BP object and the MP object, some embodiments determine ranges of z values that are internal to the BP object, hereafter referred as a range of depth internal to the BP object. The rendering of the MP object is performed for pixels having the pixel flag set. If the z value of a MP fragment of the MP object for a pixel is within at least one range of depth internal to the BP object, then the MP fragment is on the boundary of the Boolean intersection of the BP object and the MP object and the color of the MP fragment is determined and stored in the color buffer.

As shown in FIG. 10, depending on the shape of the BP object 1001 and the viewing direction, the BP object 1001 can have one or multiple ranges of depth. For example, when viewed from the viewing direction 1002 there are two ranges of depth internal to the BP object, i.e., the range of depth 1003 and the range of depth 1004, commonly referred herein as a set of ranges of depth. For each face having the face flag and for each pixel on that face having the pixel flag, the range of depth is determined forming a set of ranges of depth internal to the BP object. For example, for the ranges of depth 1003 and 1004, one embodiment stores four z values: the first z value for enter of the range 1003, a second value for exit of the range 1003, a third value for enter of the range 1004, a fourth value for exit of the range 1004.

The number of z values that must be stored for each pixel is equal to twice the number of ranges of depth. However, the BP object can include multiple thin segments, like teeth on a comb, such that for some viewing directions the number of the ranges of depth is very large. In such situations, the memory requirement to store all z values can be prohibitory large and cannot be predicted.

Therefore, one embodiment of the invention uses a multi-pass method that processes the ranges of depth of the BP object one at a time in front-to-back order. The method requires four additional z buffers in addition to the standard z buffer. One pair of extra z buffers stores the entry and the exit z value for a current range of depth and the second pair of extra z buffers stores the entry and exit z values for a previous range of depth. The method iterates through the ranges of depth in front to back order by requiring that the current entry z value be greater than the previous exit z value.

Additionally, the current exit z value must be greater than the current entry z value. However, this is an essential feature of a well formed boundary representation that there is always an exit z value before the next entry z value to avoid an unacceptable topological ambiguity. Hereafter, the four additional z buffers are referred to as a previous z front, a previous z back, a current z front and a current z back.

Referring to FIG. 12, during an initialization step the values of every pixel in the previous z front buffer and the current z front buffer are set 1201 to 0.0 and the values for every pixel in the previous z back buffer and the current z back buffers are set 1202 to 1.0. Next, the method iterates 1203 over the faces of the BP object and each face of the BP object having face flag set 1204 is projected into the screen coordinate system 1205 and rasterized 1206.

Rasterization of the face is skipped over all pixels that do not have the pixel flag set 1207. For each BP fragment of a face of the BP object where the pixel flag is set, a z test is performed 1208 to determine whether the BP fragment is occluded by the pixel in the frame buffer. If the BP fragment has a greater z value than the value in the standard z buffer, the BP fragment is occluded and requires no additional processing. If all of the BP fragments associated with the face are occluded then the face flag is cleared and the face is not processed again.

Next, a normal vector of the face is determined from the cross product of a pair vectors along two edges of the face. The normal vector is transformed using the view matrix and a vector dot product between the viewing direction and the normal vector of the face is computed to determine orientation 1209 of the face, i.e., whether the face is oriented toward the front or back. If the dot product is positive, the face is oriented away from the viewing direction and is back facing face, otherwise the face is front facing. The z value of each BP fragment of a front facing face is compared 1210 to the values in both the previous z front buffer and the current z front buffer. If the z value of the BP fragment is greater than the value previous z front buffer and less than the value in the current z front buffer, then the f z value is stored 1211 to the current z front buffer. If all fragments of a front face have a z value less than or equal to the value in the previous z front buffer, then the face flag is cleared and the face is not processed again.

The z value of each back facing fragment is compared to the z values in both the previous z back buffer and the current z back buffer. If the z value of the fragment is greater than the value in the previous z back buffer and less than the value in the current z back buffer 1212, then the z value of the BP fragment is stored 1213 to the current z back buffer. If all fragments of a back facing face have a z value less or equal to than the value in the previous z back value then the face flag for that face is cleared and the face is not processed again.

After the set of ranges of depths is determined for all pixels having pixel flag is set, the rendering of the MP object is performed for those pixels resulting in MP fragments from the MP object. The rendering iterates 1214 over the pixels in the auxiliary frame buffer and for each pixel that has the pixel flag set 1215 the intersection 1216 of a ray with the MP object is computed resulting in a set of MP fragments of the MP object. Each MP fragment of the MP object is z tested against the inside interval 1217. If the z value for a MP fragment is within the range of depth, i.e., the z value of the fragment is greater than the z value in the current z front buffer and less than the z value in the current z back buffer, the MP fragment is on the boundary of the Boolean intersection of the BP object and the MP object. Therefore, the color of the MP fragment is computed and the color and z value of the MP fragment are stored 1218, respectively, in the color buffer and standard z buffer, and the pixel flag is cleared 1219. If all of the pixel flags in the auxiliary buffer have been cleared, then the rendering of the image is completed.

However, if there are any pixel flags in the auxiliary buffer that are still set after the MP object is rendered, the z values in the current z front buffer and the current z back buffer are copied to the previous z front buffer and the previous z back buffer, respectively, and the current z front and current z back buffers are set to 1.0 for use in determining the next range of depth internal to the BP object. This process of determining consecutive range of depth subsequent with the rendering of the MP object repeats until there are no pixel flags set 1220.

Figure 14:
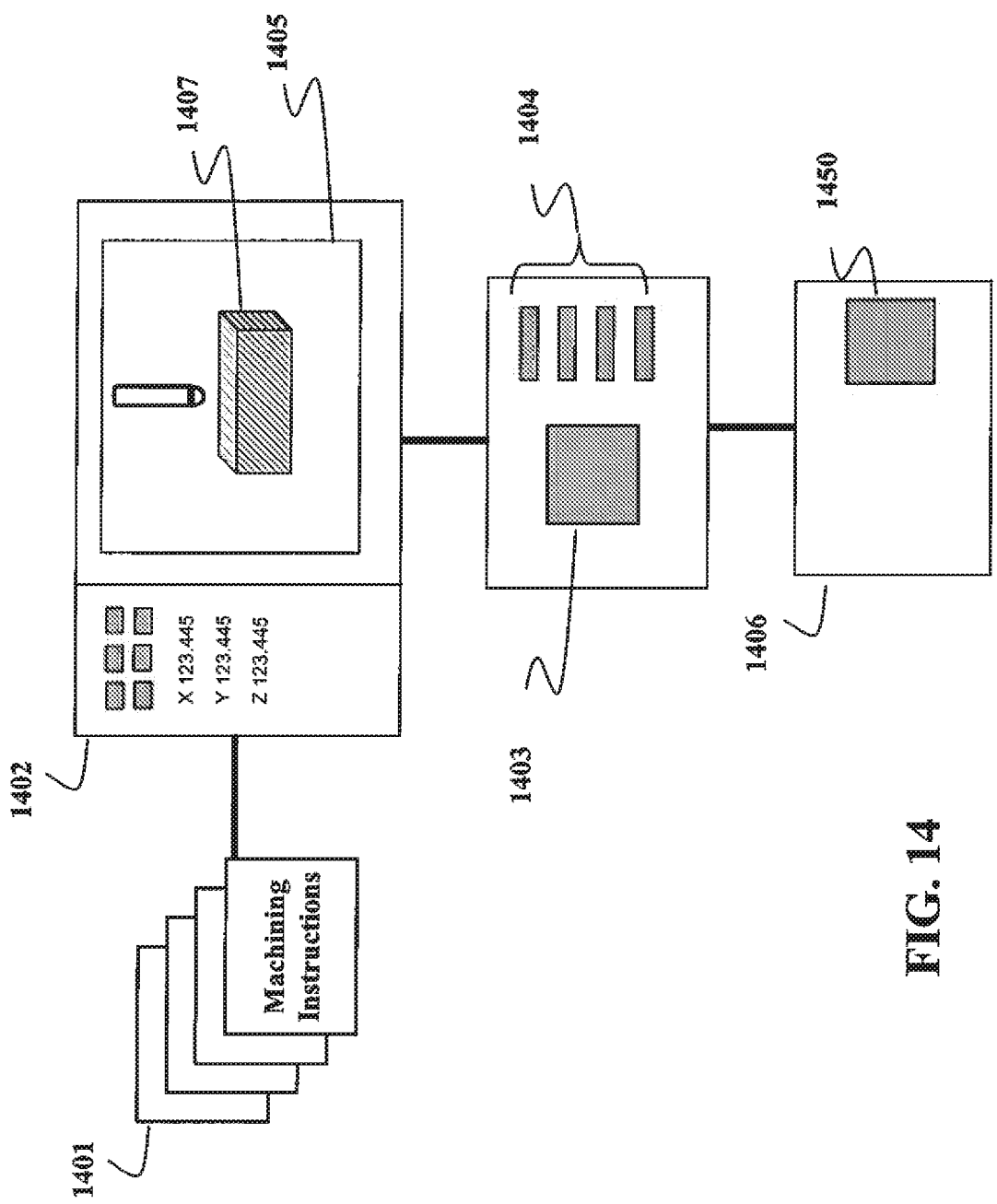
FIG. 14 is a schematic of a computer system according one embodiment of the invention.

FIG. 14 shows a schematic of a computer system according to some embodiments of the invention. The set of machining instructions 1401 is provided to an NC machining controller 1402, either as a file over a network, from a CD or DVD, or by some other means known in the art. The controller 1402 includes of a processor 1403, memory 1404 and a display 1405 for showing the operation of the machine. Running on the processor is a machining simulator 1406 that received the milling instructions 1001 and employs the method of this invention 1450 to produce an image 1407 of the simulated workpiece on the display 1405.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The embodiments of the invention are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Effect of the Invention

Embodiments of the invention describe a system, a computer product and a method for simulating machining an object. Embodiments allow for machining simulation of a model of an object without modifying the model itself. Furthermore, by introducing a proxy object to be machined instead of the model of the object, the embodiments allow for machining simulation of an object having one type of surface representation with a set of swept volumes having another type of surface representation.

Although the invention has been described by way of examples of embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for simulating machining of an object by a motion of a tool, wherein the object is represented by a boundary representation (BP) object, wherein the BP object includes a boundary representation of a surface of the object, wherein the motion is represented by a set of swept volumes, wherein the set of swept volumes includes a first set of implicit functions defining, a surface of the set of swept volumes, comprising the steps of:
determining a proxy object having a second set of implicit functions defining a surface of the proxy object;
simulating the machining of the proxy object, with the set of swept volumes to produce a machined proxy (MP) object having a third set of implicit functions defining a surface of the MP object;
rendering an image of a Boolean intersection between the MP object and the BP object, wherein steps of the method are performed by a processor.

2. The method of claim 1, wherein an implicit function is selected from a group consisting of: a distance field, a sampled distance field, an adaptively sampled distance field, a composite adaptively sampled distance field, and combinations thereof.

3. The method of claim 1, wherein the rendering is performed from a viewing direction, 4. The method of claim 1, wherein a surface of the BP object includes BP object fragments in a world coordinate system, wherein a surface of the MP object includes MP object fragments in the world coordinate system, and wherein the rendering further comprises:
determining a set of BP object fragments internal to the MP object;
determining a set of NIP object fragments internal to the BP object; and
converting the set of BP object fragments and the set of MP object fragments into a set of pixels in an image coordinate system forming at least part of the image.

5. The method of claim 4, wherein the determining the set of BP object fragments includes:
determining a distance from a BP object fragment to the surface of the MP object, wherein the distance is determined in the world coordinate system; and
adding the BP object fragment in the set of BP object fragments, if the distance indicates that the BP object fragment is internal to the MP object.

6. The method of claim 4, wherein the determining the set of MP object fragments includes:
determining a depth of a VP object fragment in the image coordinate system; and
adding the MP object fragment in the set of MP object fragments, if the depth is within at least one range of depths internal to the BP object, wherein the range of depth is determined in the image coordinate system.

7. The method of claim 5, further comprising:
adding the BP object fragment in a set of machined BP object fragments, if the distance indicates that the BP object fragment s external to the MP object.

8. The method of claim 7, wherein the determining the set of MP object fragments includes:
determining MP object fragments corresponding to BP object fragments in the set of machined BP object fragments;
determining a depth of each corresponding MP object fragment in the image coordinate system; and
adding the corresponding MP object. fragment into the set of MP object fragments, if the depth is within at least one range of depths internal to the BP object, wherein the range of depth is determined in the image coordinate system.

9. The method of claim 8, further comprising:
determining a correspondence between the MP object fragment and the BP object fragment of the set of machined BP object fragments in the image coordinate system.

10. The method of claim 9, further comprising:
setting a pixel flag for a pixel corresponding to the BP object fragment of the set of machined BP object fragments, such that the pixel flag determines the correspondence between the MP object fragment and the BP object fragment.

11. The method of claim 9, further comprising:
setting a face flag for at least one face of the BP object corresponding to the BP object fragment of the set of machined BP object fragments to produce at least one machined face; and
determining the range of depths internal to the BP object only for the machined face.

12. The method of claim 1, further comprising:
determining, in a world coordinate system, BP object fragments on a surface of the BP object;
determining, in the world coordinate system, a set of BP object fragments internal to the MP object and a set of machined BP object fragments external to the MP object;
determining, in the image coordinate system, a set of machined faces of the BP object, each machined face corresponds to at least one BP object fragments in the set of machined BP object fragments;
determining, in the image coordinate system, a set of ranges of depths internal to the BP object, wherein at least one range of depth is determined for at least one machined face;
determining, in the world coordinate system, MP object fragments on the surface of the MP object;
determining, in the image coordinate system, MP object fragments corresponding to BP object fragments in the set of machined BP object fragments;
adding a corresponding MP object fragment in the set of MP object fragments, if a depth of the corresponding MP object fragment, in the image coordinate system, is within at least one range of depths from the set of ranges of depths; and
converting the set of BP object fragments and the set of MP object fragments into a set of pixels in an image coordinate system forming at least part of the image.

13. The method of claim 1, wherein a shape of the proxy object at least circumscribes a shape of the BP object.

14. The method of claim 1, wherein the proxy object is solid.

15. A computer system for performing a computer simulation of a milling of an object by a motion of a milling tool, wherein the object is represented by a model of the object, wherein the motion of the milling tool is represented by a set of swept volumes, comprising a processor configured for:

determining a proxy object, such that a shape of the proxy object at least circumscribes a shape of the model of the object;

simulating the milling of the proxy object with the set of swept volumes to produce a machined proxy object; and rendering an image of a Boolean intersection between the machined proxy object and the model of the object.

16. The system of claim 15, wherein a representation of a surface of the model of the object and a representation of a surface of the set of swept volumes are different types of representations.

17. The system of claim 15, wherein a representation of a surface of the model of the object and a representation of a surface of the set of swept volumes are of the same type of representation.

18. A computer program product for performing a computer simulation of a milling of an object by a motion of a milling tool, wherein the object is represented by a boundary representation (BP) object, wherein the BP object. includes a boundary representation of a surface of the object, wherein the motion of the milling tool is represented by a set of swept volumes, wherein the set of swept volumes includes a first set of implicit functions defining a surface of the set of swept volumes, comprising:

computer readable non-transitory storage medium comprising computer usable program code embodied therewith, wherein the program code configured for:

determining a proxy object having a second set of implicit functions defining a surface of the proxy object;

simulating the milling of the proxy object with the set of swept volumes to produce a machined proxy (MP) object having a third set of implicit functions defining a surface of the MP object;

rendering an image of a Boolean intersection between the MP object and the BP object; and storing the image into a memory.

19. The computer program product of claim 18, wherein the program code is further configured for: determining, in a world coordinate system, BP object fragments on a surface of the BP object; determining, in the world coordinate system, a set of BP object fragments internal to the MP object and a set of machined BP object fragments external to the MP object; determining, in the image coordinate system, a set of machined faces of the BP object, each machined face corresponds to at least one BP object fragments in the set of machined BP object fragments; determining, in the image coordinate system, a set of ranges of depths internal to the BP object, wherein at least one range of depth is determined for at least one machined face; determining, in the world coordinate system, MP object fragments on the surface of the MP object; determining, in the image coordinate system, MP object fragments corresponding to BP object fragments in the set of machined BP object fragments; adding a corresponding MP object fragment in the set of MP object fragments, if a depth of the corresponding MP object fragment, in the image coordinate system, is within at least one range of depths from the set of ranges of depths; and converting the set of BP object fragments and the set of MP object fragments into a set of pixels in an image coordinate system forming at least part of the image.

20. The computer program product of claim 18, wherein each set of implicit function includes an implicit function selected from a group consisting of a distance field, a sampled distance field, an adaptively sampled distance field, a composite adaptively sampled distance field, and combination thereof.

* * * * *